US012658573B1

(12) United States Patent (10) Patent No.: US 12,658,573 B1
Halperin (45) Date of Patent: Jun. 16, 2026

(54) TRIANGULAR COMMUNICATION ANTENNA ARRAY

(71) Applicant: AST & Science, LLC, Miami, FL (US)

(72) Inventor: Adam H. Halperin, Silver Spring, MD (US)

(73) Assignee: AST & Science, LLC, Miami, FL (US)

(*) Notice: Subject to any disclaimer, the term of this patent is extended or adjusted under 35 U.S.C. 154(b) by 721 days.

(21) Appl. No.: 18/087,373

(22) Filed: Dec. 22, 2022

Related U.S. Application Data

(60) Provisional application No. 63/292,893, filed on Dec. 22, 2021.

(51) Int. Cl.
| | |
|---|---|
| *H04W 16/14* | (2009.01) |
| *H01Q 1/28* | (2006.01) |
| *H01Q 3/26* | (2006.01) |
| *H04B 7/185* | (2006.01) |

(52) U.S. Cl.
CPC ............... *H01Q 3/26* (2013.01); *H01Q 1/288* (2013.01); *H04B 7/18513* (2013.01)

(58) Field of Classification Search
CPC .... H04B 7/0617; H04B 7/088; H04B 7/0802; H04B 7/2041; H04B 7/06952; H04B 7/18515; H04B 7/18513; H04B 10/118; H04B 7/18578; H04W 16/28; H04W 84/06
See application file for complete search history.

(56) References Cited

U.S. PATENT DOCUMENTS

| | | | |
|---|---|---|---|
| 9,973,266 | B1 | 5/2018 | Avellan et al. |
| 10,979,133 | B2 | 4/2021 | Avellan et al. |
| 11,021,270 | B2 | 6/2021 | Honour et al. |
| 11,575,204 | B1 * | 2/2023 | Veysoglu ............... H01Q 21/29 |
| 2019/0207676 | A1 * | 7/2019 | Noerpel ............... H04B 7/2041 |
| 2020/0361635 | A1 | 11/2020 | Braun et al. |
| 2020/0366237 | A1 | 11/2020 | Hernandez Bahlsen et al. |
| 2022/0263915 | A1 * | 8/2022 | Yang ..................... H04L 41/082 |

* cited by examiner

*Primary Examiner* — Khalid W Shaheed
(74) *Attorney, Agent, or Firm* — Botos Churchill IP Law

(57) ABSTRACT

Phased arrays on satellites that approximate/emulate the shape of a rounded triangle such that elliptical apertures can be generated in any desired direction while requiring the minimum possible phased array area. The common shapes for phased arrays are circular, square, or hexagonal, with circular phased arrays often being viewed as the preferred shape. However, it is shown here that rounded triangular phased arrays can be generated to accommodate elliptical apertures as necessary to serve the field of view beneath a satellite and do so with fewer antennas than their circular counterparts. For applications where elliptical apertures are desirable, such as satellite-to-Earth communications, the rounded triangular model for phased arrays is demonstrably more efficient than the circular model.

29 Claims, 28 Drawing Sheets

302 small satellite

301 Bounding Shape

Phased Array 300

402c Hexagonal Service Cell

Beam Contour

312f Elliptical Aperture

300 Triangular Phase Array

West Edge Beam

Circular Approach

Rounded Triangular Approach

Single beam center location

Distributed beam center locations

Good Fit

Best Fit Triangle

Excess Area

Missing Area

Poor Fit

Best Fit Square

Poor Fit

Best Fit Circle

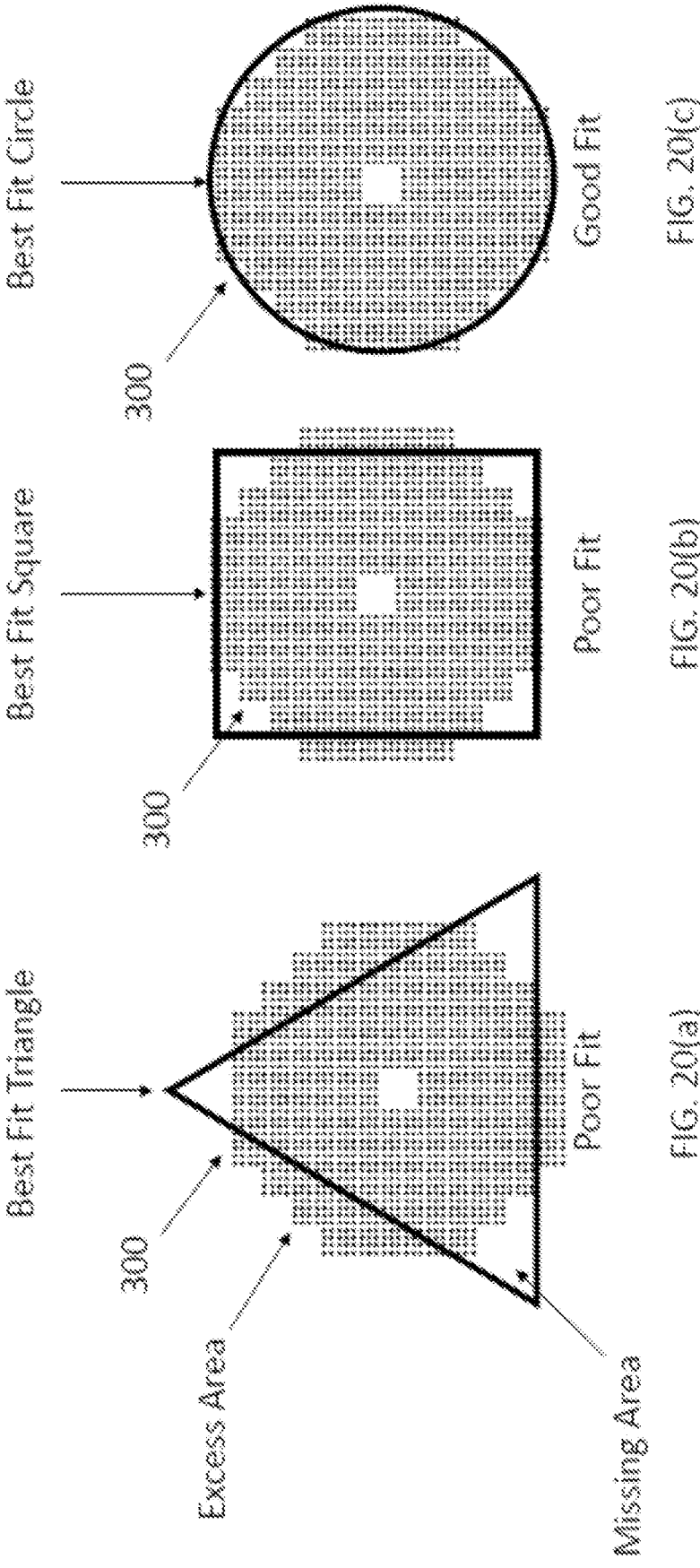

TRIANGULAR COMMUNICATION ANTENNA ARRAY

CROSS-REFERENCE TO RELATED APPLICATIONS

This application claims the benefit of priority of U.S. Provisional Application No. 63/292,893 filed on Dec. 22, 2021, the content of which is relied upon and incorporated herein by reference in its entirety.

BACKGROUND

U.S. Pat. Nos. 9,973,266 and 10,979,133 show a system for assembling many small satellite antenna assemblies in space to form a large array. The entire content of these patents is incorporated herein by reference.

Communications satellites operating with many customers can make use of service cells as groupings of users so that each customer is not handled individually. A service cell is a fixed geographic region wherein users share a frequency band used for communications to all users in that cell. To provide service to all users within a service cell, the communications satellite must create a beam of radio-frequency power that reaches at least to the edges of the service cell so that all users in the cell receive service. With a dense arrangement of service cells, the beam must also be small enough to avoid overlapping significantly with nearby service cells, which would cause interference between communications.

SUMMARY

Radio frequency beams are generally focused to an extent determined by the size of the antenna that forms the beam. Large antennas form highly focused beams and small antennas form wide beams. Phase arrays are physically made of many antennas together but not all antennas are used to create every beam that the phase array generates. A wide beam can be created using only a few antennas or a maximally focused beam can be used with many or all of the antennas in the phase array. A phase array satellite forming beams towards service cells will try to create beams of just the right size. This means the phase array must itself be made of sufficient size and in the proper shape to form those beams appropriately using the right arrangement and number of antennas.

If the phase array is too small, it will be unable to form beams focused enough to match the size of the service cells. If it is an uneven shape, it will be able to form appropriately sized beams in certain directions and not others. If it is oversized, it has been built with more antennas and has cost more than is truly necessary. Herein, a planar phase satellite array has a shape that generates beams which conform to the shape of service cells of varying direction and distance relative to the satellite in low earth orbit.

This summary is not intended to identify all essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

Figure 1A:
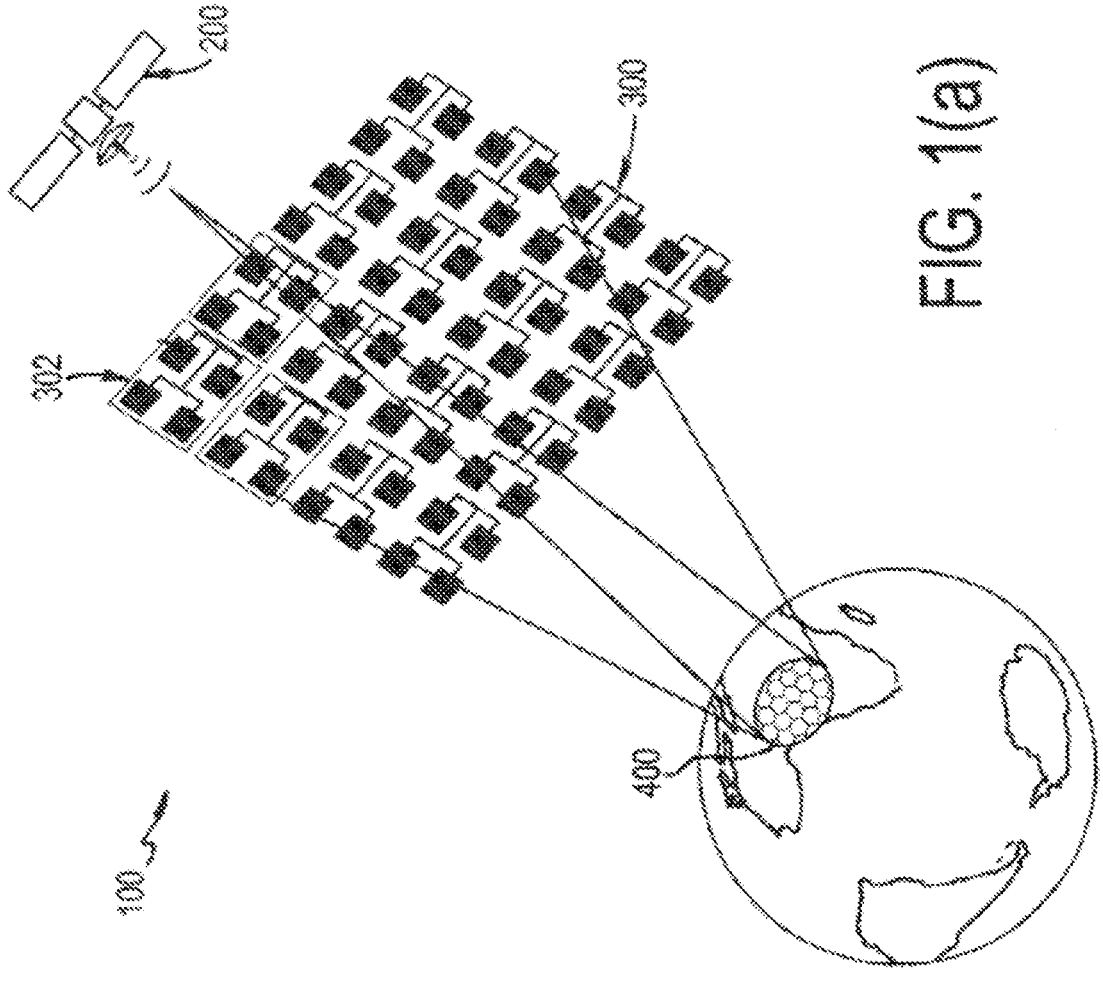
FIG. 1(a) shows a satellite antenna phased array in space.

The figures show illustrative embodiments of the present disclosure. Other embodiments can have components of different scale. Like numbers used in the figures may be used to refer to like components. However, the use of a number to refer to a component or step in a given figure has a same structure or function when used in another figure labeled with the same number, except as otherwise noted.

DETAILED DESCRIPTION

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

Figure 1B:
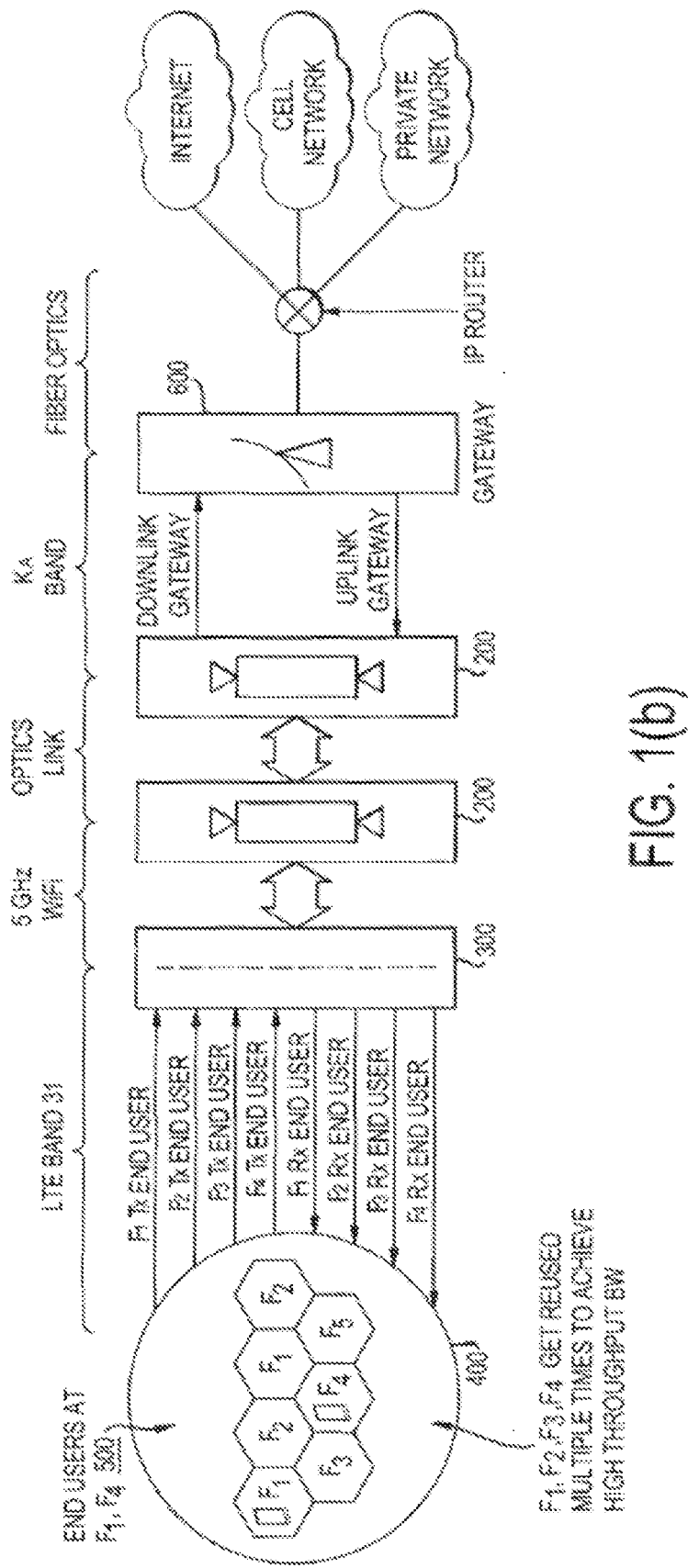
FIG. 1(b) is a block diagram of the phased array communication system.

FIGS. 1(*a*), 1(*b*) show a satellite communication system 100 having an array 300 of common or small satellites 302, referred to here as microns, and a central or control satellite 200. The small satellites 302 communicate with end users 500 within a footprint 400 on Earth, and communicate with the control satellite 200, which in turn communicates with a gateway 600 at a base station. The small satellites 302 can each include, for example, a processing device (e.g., a processor or controller) and one or more antenna elements. And the control satellite 200 can include a processing device and can optionally include one or more antenna or antenna elements.

Figure 2A:
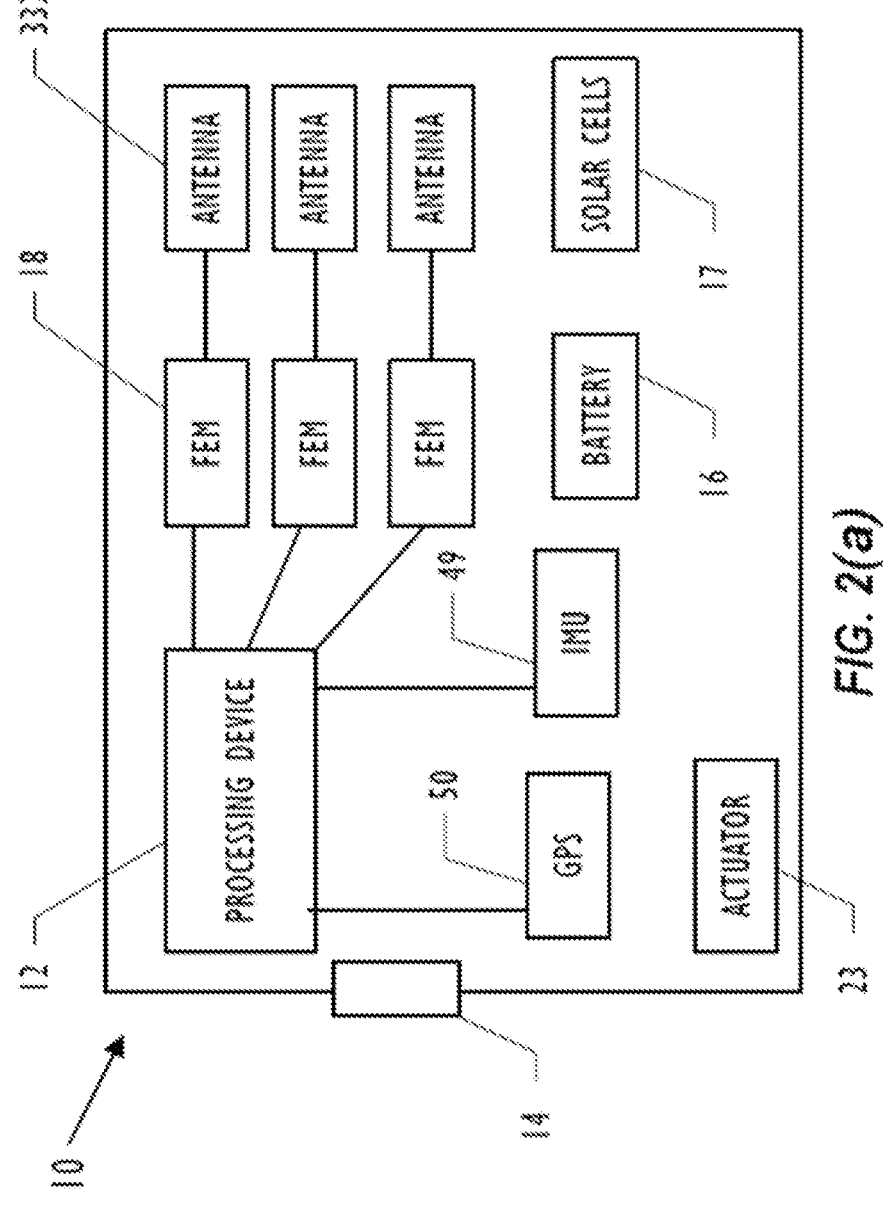
FIG. 2(a) is a block diagram of the small antenna satellite of a satellite antenna phased array in accordance with the present disclosure.
Figure 2B:
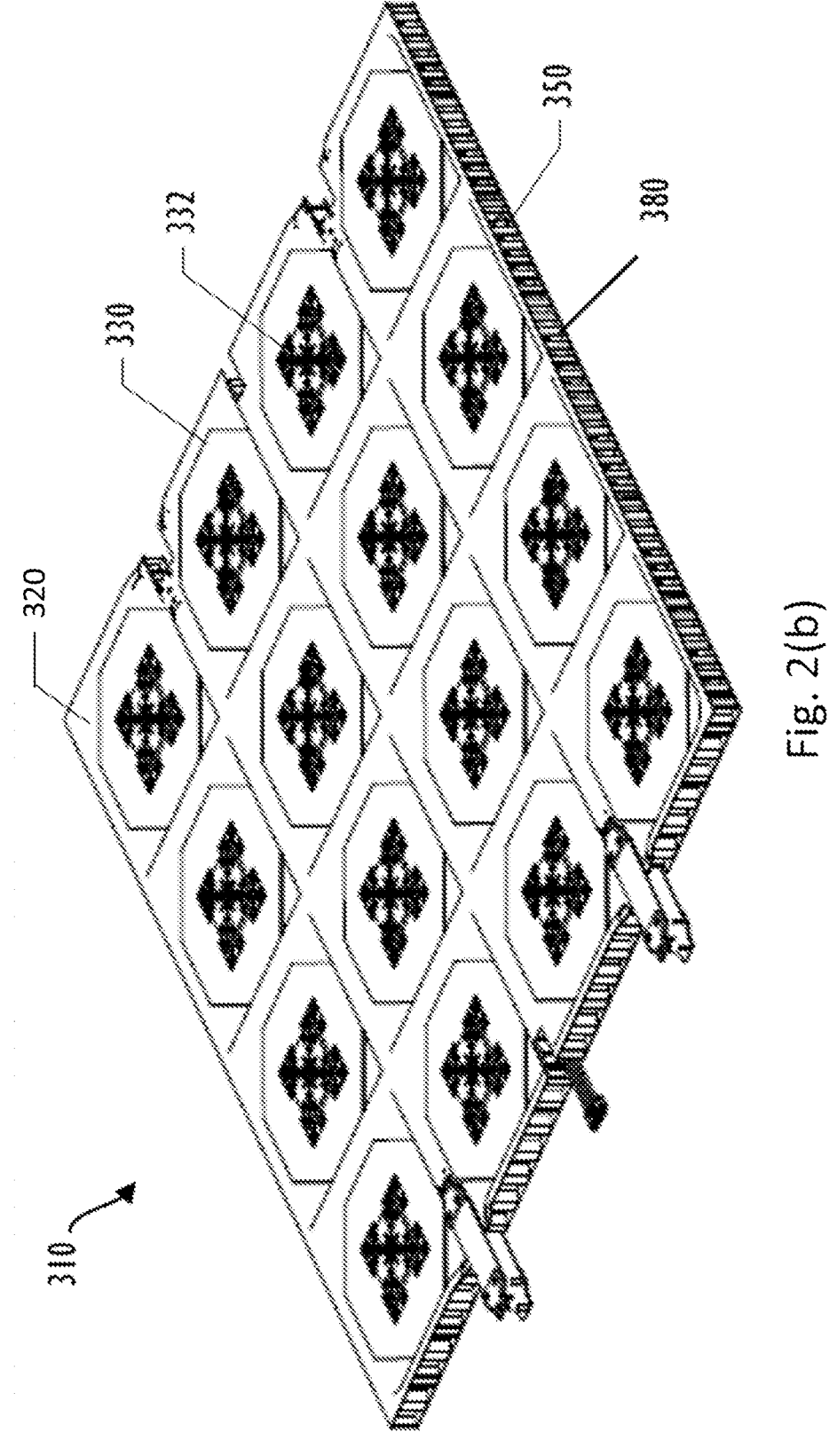
FIG. 2(b) is a perspective view of the small antenna satellite of FIG. 2(a)

Referring to FIG. 2(*a*), in one example embodiment, the electronics of a single small satellite 302 is shown. In this embodiment the structure is an assembly or small satellite that is connected to other small satellites 302 in a large antenna array 5 (FIG. 3), such as in the satellite array 300. The overall system forms an Altitude and Orbit Control System (AOCS) that can include the small satellite 302, control satellite 200, and/or ground station. The control satellite 200 is fixedly connected to the small satellites 302, such as at the center of the array as in FIGS. 3(*a*), 3(*b*), 3(*c*), though in other embodiments the control satellite 200 can be fixedly connected at other positions such as along a side or corner of the array 300 or offset from the center.

The structure of the small satellite 302 is further shown in FIG. 2(*b*) as comprising a satellite assembly or antenna assembly 310. The satellite assembly 310 is flat and rectangular or square, with one or more communication components (e.g., one or more antenna elements 332) at one side surface 7 (FIG. 3(*a*)) facing the Earth (nadir) to communicate with user devices (e.g., cell phones) and an opposite side surface 9 (FIG. 3(*a*)) facing in the opposition direction (zenith) with solar cells 17 that generate solar power for use by the electronic components, e.g., a processing device 12, antennas 332, battery 16, IMU 49, GPS 50, actuator 23, and antenna front end modules 18. Each structure 310 also has one or more connectors 14, which represents a mechanical connection and/or an electronic connection between adjacent small satellites 302. Though multiple antennas 332 are shown and described, the small satellite can have one or more antenna elements 332.

The satellite assembly 310 can be any suitable structure, such as shown and described in U.S. patent Ser. No. 11/021,270, U.S. Publ. Nos. 2020/0361635 and 2020/0366237, the entire content of which are hereby incorporated by reference. The satellite assembly 310 can have a first outer layer 320, a middle layer 350, and a second outer layer 380. The first outer layer 320 is an aluminum reflector that retains the antenna elements 332, and can be referred to here as the RF (radio frequency) layer or antenna layer. The middle layer 350 is a support structure such as a lightweight, rigid honeycomb. The second outer layer 380 is a solar panel having one or more solar cells that collect solar energy from the Sun, and can be referred to here as the solar layer. The satellite assembly 310 is configured for the RF layer 320 to be closest to the Earth so that the antenna elements 332 are nadir facing (face the Earth) to best communicate with user devices on the ground without any interference or obstruction (i.e., no physical interference by the antenna assembly, and no or reduced electrical interference from other electronic devices at the antenna assembly). In addition, the solar layer 380 is zenith facing (faces away from the Earth) and collects solar energy from the Sun and generates power from the solar energy that can be utilized to power electronic components on the antenna assembly 310.

Each satellite assembly 310 has a circuit or component assembly (FIGS. 2(*a*), 4(*a*)) and a structural assembly (FIG. 2(*b*)). The component assembly includes an antenna 332, and an electronic circuit. The electronic circuit can include a variety of one or more electronic components including, for example, a processing device such as processor 12, cables, FEM 18, and/or a power supply, such as a battery or batteries 16. The structural assembly houses and supports the component assembly and can include, for example, the outer layers 320, 380, the middle layer 350, and accompanying structural elements. Though certain elements are described as being part of the circuit assembly and other elements as part of the structural assembly, the elements can be considered part of the other assembly or both the circuit assembly and the structural assembly.

Figure 4A:
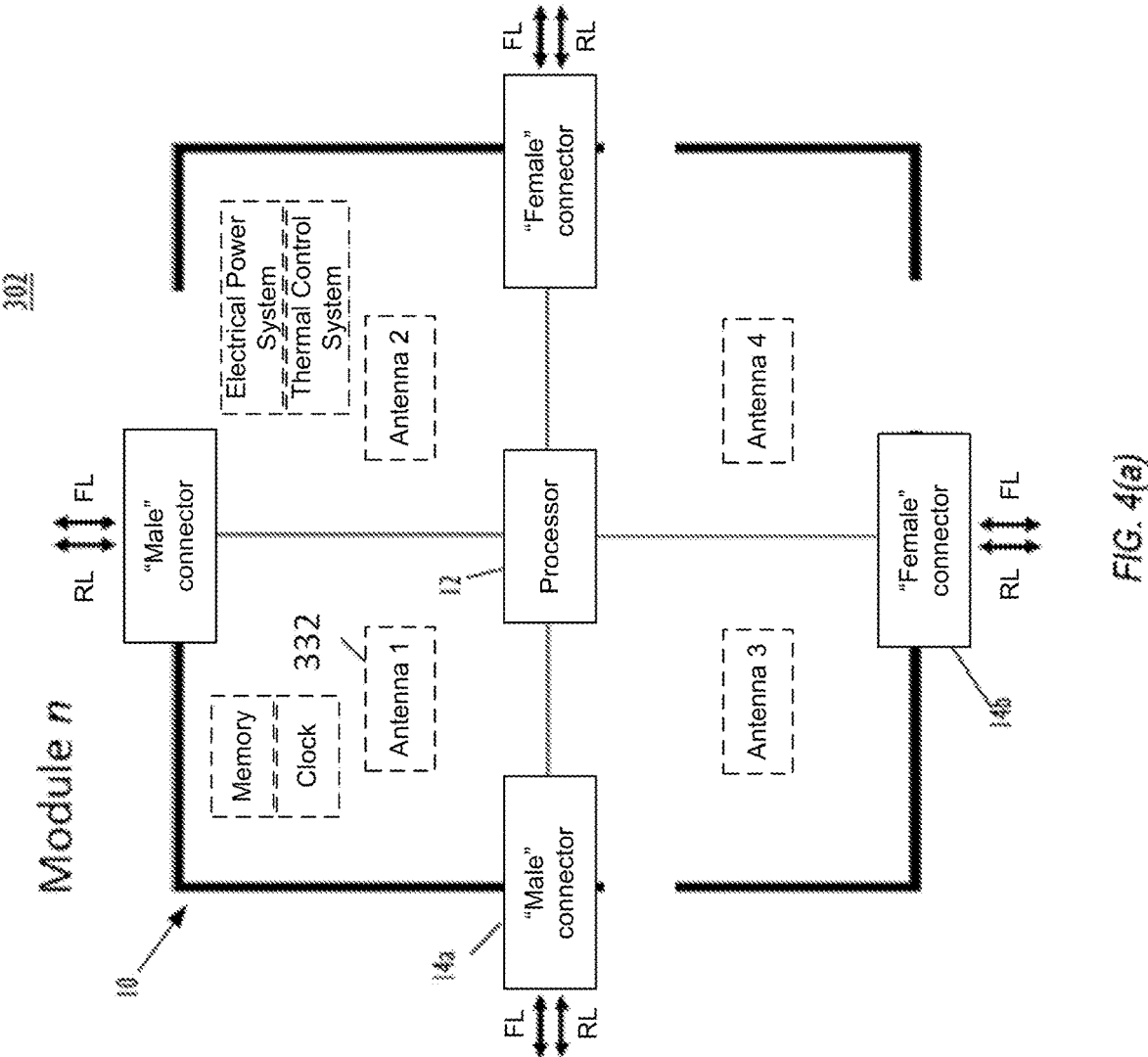
FIG. 4(a) is another block diagram of the small antenna satellite of a satellite phased array in accordance with the present disclosure.
Figure 4B:
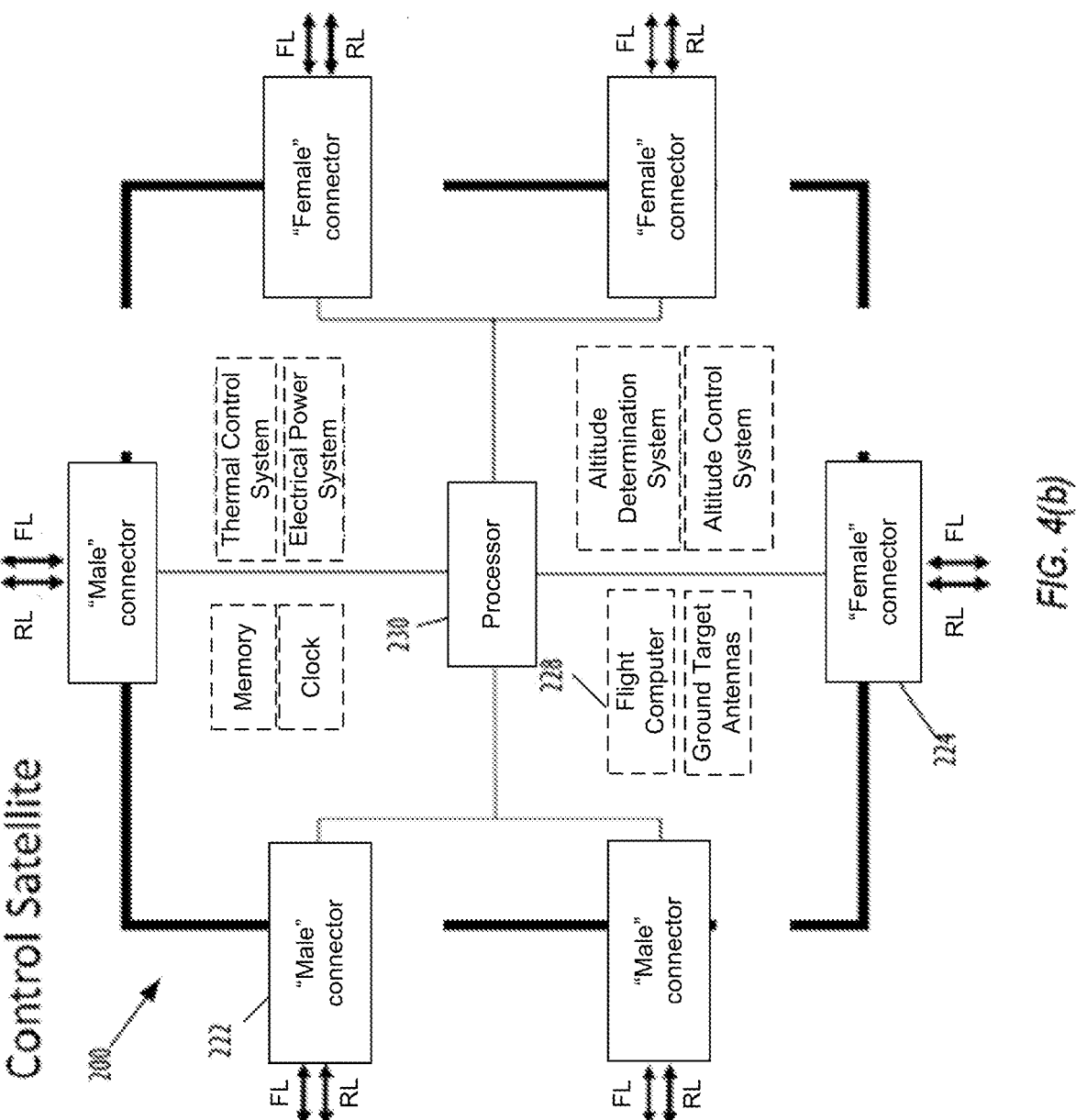
FIG. 4(b) is a block diagram of the control satellite of a satellite phased array in accordance with the present disclosure.

Referring to FIG. 4(*a*), the connectors 14 are shown in greater detail, and can include a male connector 14*a* and a female connector 14*b*. The small satellites 302 are used in a coordinated fashion to function as a large aperture phased array in space. The array can be planar, or non-planar such as curved. The signal that any one module receives from Earth is not necessarily useful, but after the aggregation of the signal received by all modules, specific signals can be distinguished. This aggregation requires the signal information received by all modules to be processed by small satellite processors 12 and the control module processor 230 and is referred to as the Forward Link (FL). Thus, the FL is received by the processor 12, which performs the calculations necessary to send the forward link data across its antennas 332 to the users on the ground. That exact same forward link information is passed on to adjacent modules for which the module in question is an intermediary. Conversely, any one module 302 is unable to send a signal of sufficient strength to Earth, and so their signals must be coordinated by the control satellite 200. This coordination requires that the control satellite 200 send information to each small satellite module 302 indicating how and when to excite their antennas 332 and is referred to as the Return Link (RL).

Figure 3A:
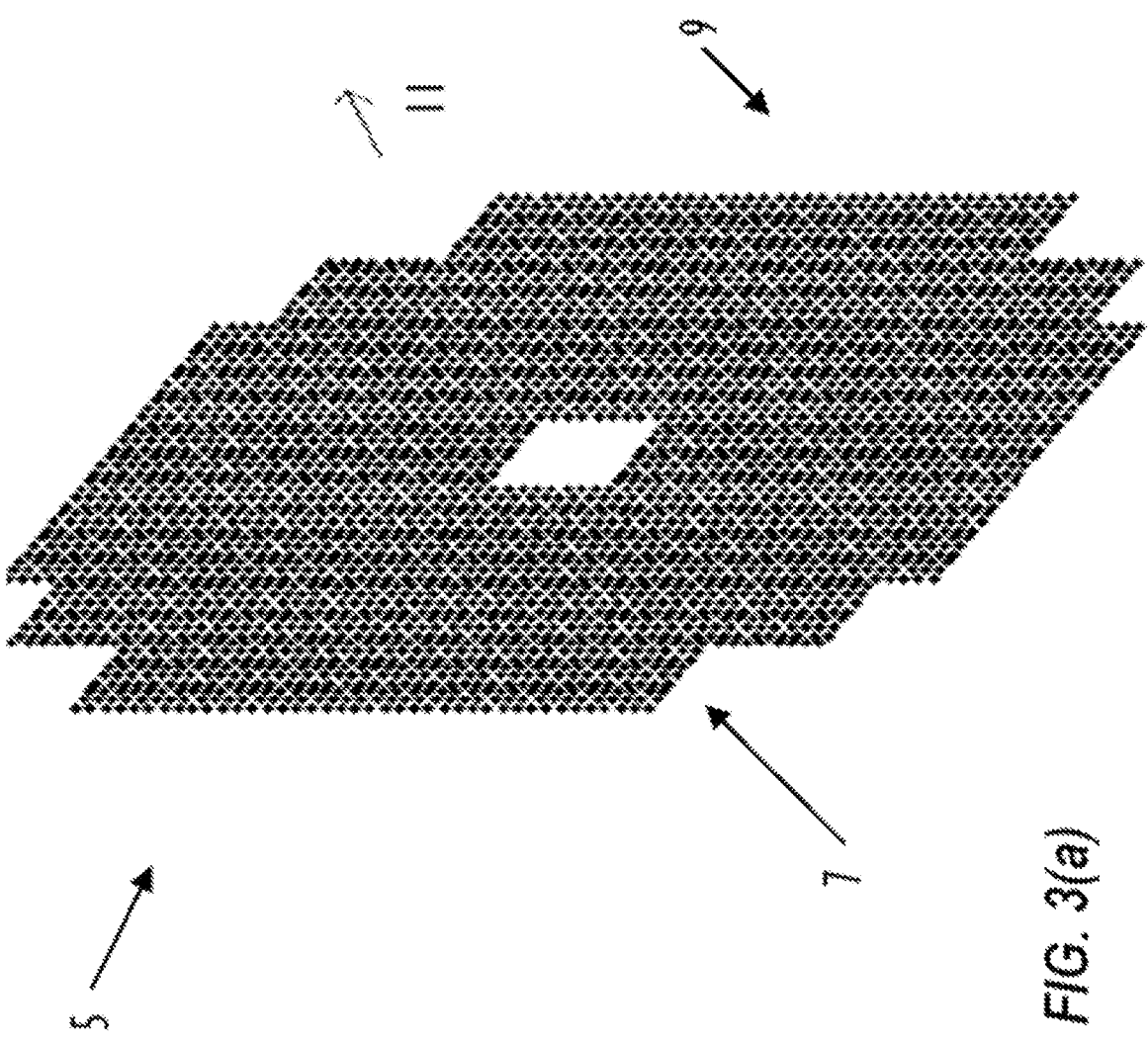
FIG. 3(a) is a perspective view of a phased array having a circular configuration.
Figures 3B, 3C:
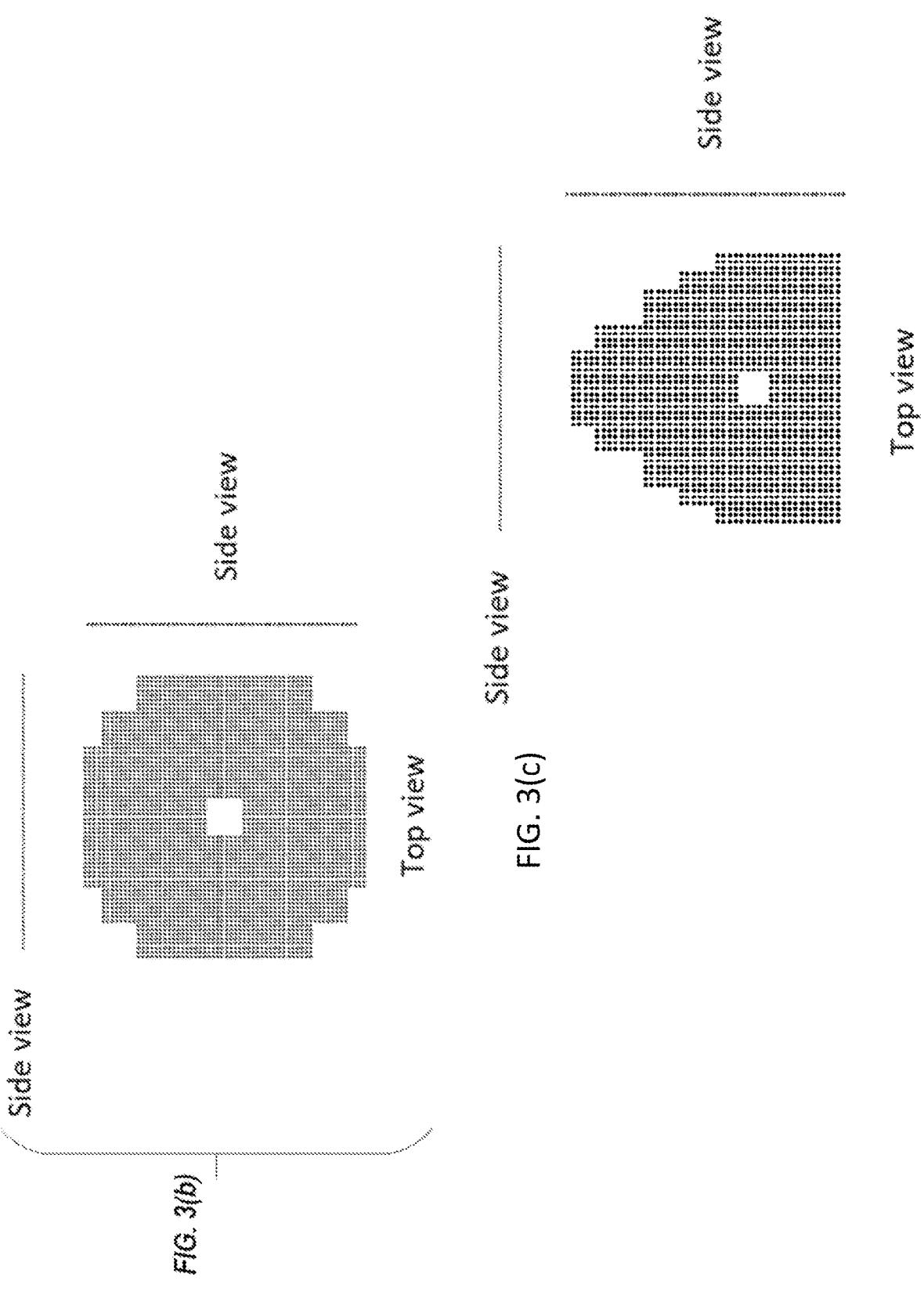
FIG. 3(b) is top and side views of the phased array of FIG. 3(a)
FIG. 3(c) is top and side views of a satellite antenna phased array having a triangular configuration in accordance with one embodiment of the present disclosure.

Thus, as further shown in FIG. 4(*a*), the small satellites 302 can also include other suitable components, some of which are antennas or antenna elements 332, processor 12, memory core, clock, electrical power system, thermal control system. As seen in FIG. 2(*a*), the connectors are male on two sides and female on the opposite sides, allowing adjacent modules to be connected male-to-female or female-to-male with wires as seen in FIG. 3(*a*). As seen in FIG. 4(*a*), communication of data across the connectors 14 originating at the control satellite 200 and communication of data across the high-speed connectors bound for the control satellite 200 are referred to as Forward Link (FL) and Return Link (RL), respectively. Each small satellite 302 has at least one wire through which it can communicate RL and FL data with at least one adjacent small satellite 302 or the control satellite 200. This communication could potentially be done wirelessly, but a wired connection is more suitable to handle the extremely high rate of data flow. The male and female connectors can be utilized for either FL or RL communication of data, though in one embodiment if a male (or female) connector is utilized for an FL output it is also being used as an RL input, and if it is used for an FL input it is also being used as an RL output.

As seen in FIG. 4(*b*), one embodiment of the control module 200 has a similar arrangement of male and female connectors 14 of the small satellite 302, allowing adjacent small satellites 302 to be connected male-to-female or female-to-male. The control module 200 is composed of many components, some of which are ground target antennas that communicate with the ground station gateway 600 (FIG. 1(*b*)). The ground target antennas create the link between the control satellite 200 and ground stations 600. The ground target antennas are steerable to track the ground station due to the relative motion inherent to LEO orbits. At least one ground target antenna is required for operations, one for redundancy, and any additional antennas can be added to permit additional redundancy or for multiple antennas to be used simultaneously. The antennas are deployed on orbit (as steerable antennas generally are in space) and you need one minimum for operations and one for redundancy. Having communications with more than one ground station at once requires additional antennas. The ground target antennas pass return link and forward link data to and from the ground station.

The control module 200 can also include, for example, a flight computer 228, a processor 230, memory core, clock, electrical power system, thermal control system, attitude determination system, attitude control system, and connectors 222, 224. The control module 200, depending on its shape and size, may be adjacent to one or more (including more than four) small satellites 302. The control module 200 has a number of connectors 222, 224 equivalent to the number of small satellite structure 302 with which it is adjacent.

Communication between the small satellites 302 and the control satellite 200, either directly or indirectly, is essential to the coordinated use of small satellites to form a large aperture phased array in space. The signal that any one antenna 332 receives from Earth may not by itself be of high enough quality to discern a signal sent from Earth due to external sources of signal noise. However, calculations performed on the sum of the signals received by all or a subset of the antennas 332 in the phase array 5, 100 can be used to discern signals sent from Earth. It is for this reason that the signals received by the small satellites 302 must be sent to the control satellite 200 for processing. This data originates at each of the modules and is bound for the control satellite and so falls under the category of RL data.

Figure 5:
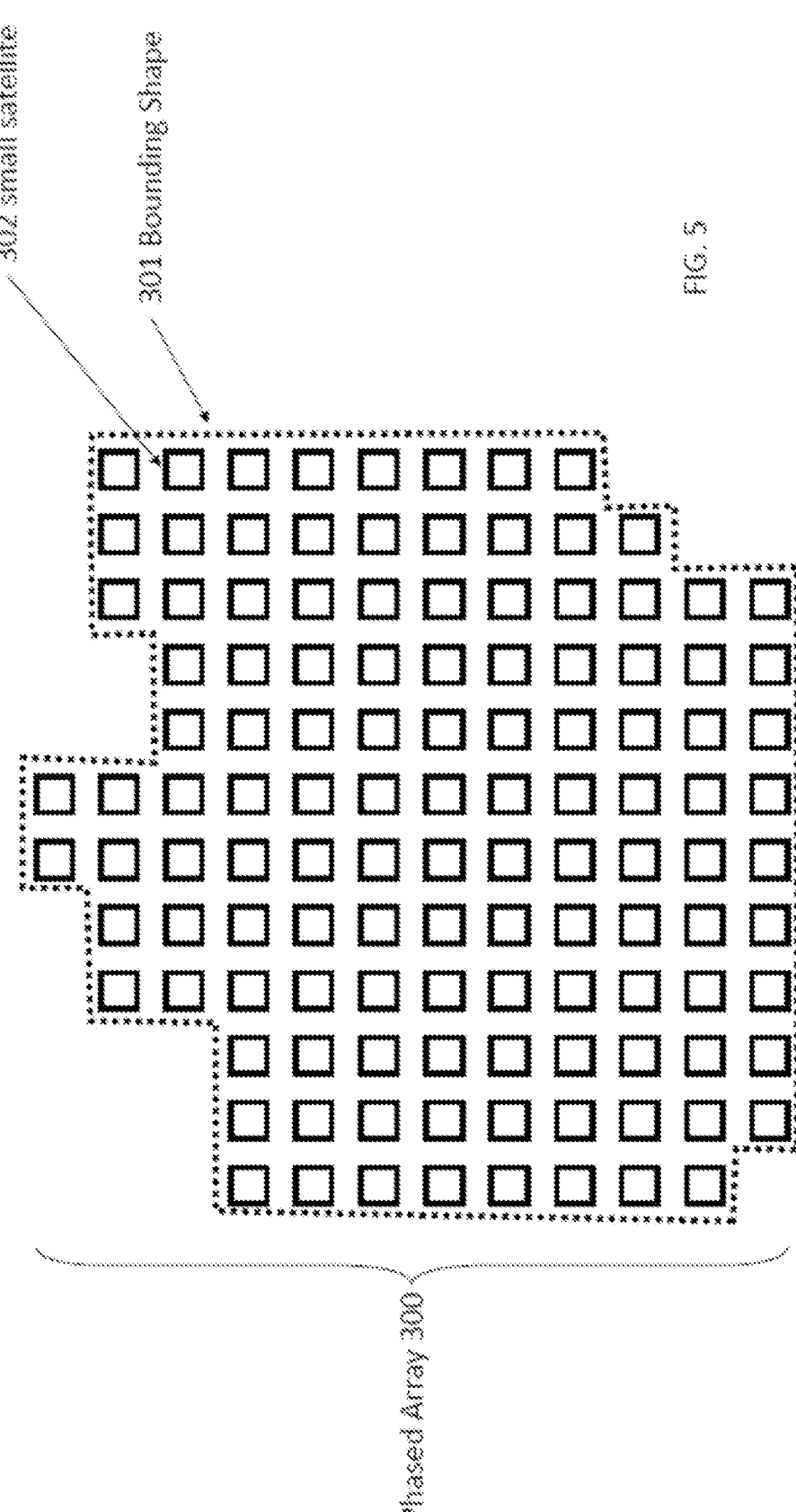
FIG. 5 is a plan view of a phased array illustrating a bounding area.

As seen in FIG. 5, the phased array 300 is a collection of small satellites 302 and optionally a control satellite 200. The phased array 300 is flat, and the outer perimeter of the phased array 300 defines a bounding shape 301. The bounding shape 301 is the simplified representation of a phased array with a suite of antennas 332 which in a coordinated fashion can project focused RF beams. The outline of the phased array defines the bounding shape. It is noted that the small satellites 302 only need to have one or more antenna 332 driven by electronics to form beams, and can have its own electronics or share electronics. It is the arrangement of the antennas 332 that is important, and the electronic components (e.g., processor 12, FEM 18, etc.) are optional and/or can be positioned at the small satellite 302, the control satellite 200, or elsewhere on the phased array.

In one embodiment (such as shown in FIG. 3(*c*), 8-11, 12(*b*), 12(*c*), 16, 18, 19(*a*)), the phased array 300 has a triangular shape that fits a set of 2-dimensional "sub-shapes" within a single larger 2-dimensional "bounding shape". A sub-shape is the simplified representation of a subset of antennas 332 within the phased array 300 that are used to generate a single beam in a single direction. Phased arrays are used to generate many concurrent beams, meaning many sub-shapes must concurrently exist. Since phased array antennas 332 can each take part in generating multiple beams, multiple sub-shapes can overlap within the phased array 300.

Figure 6:
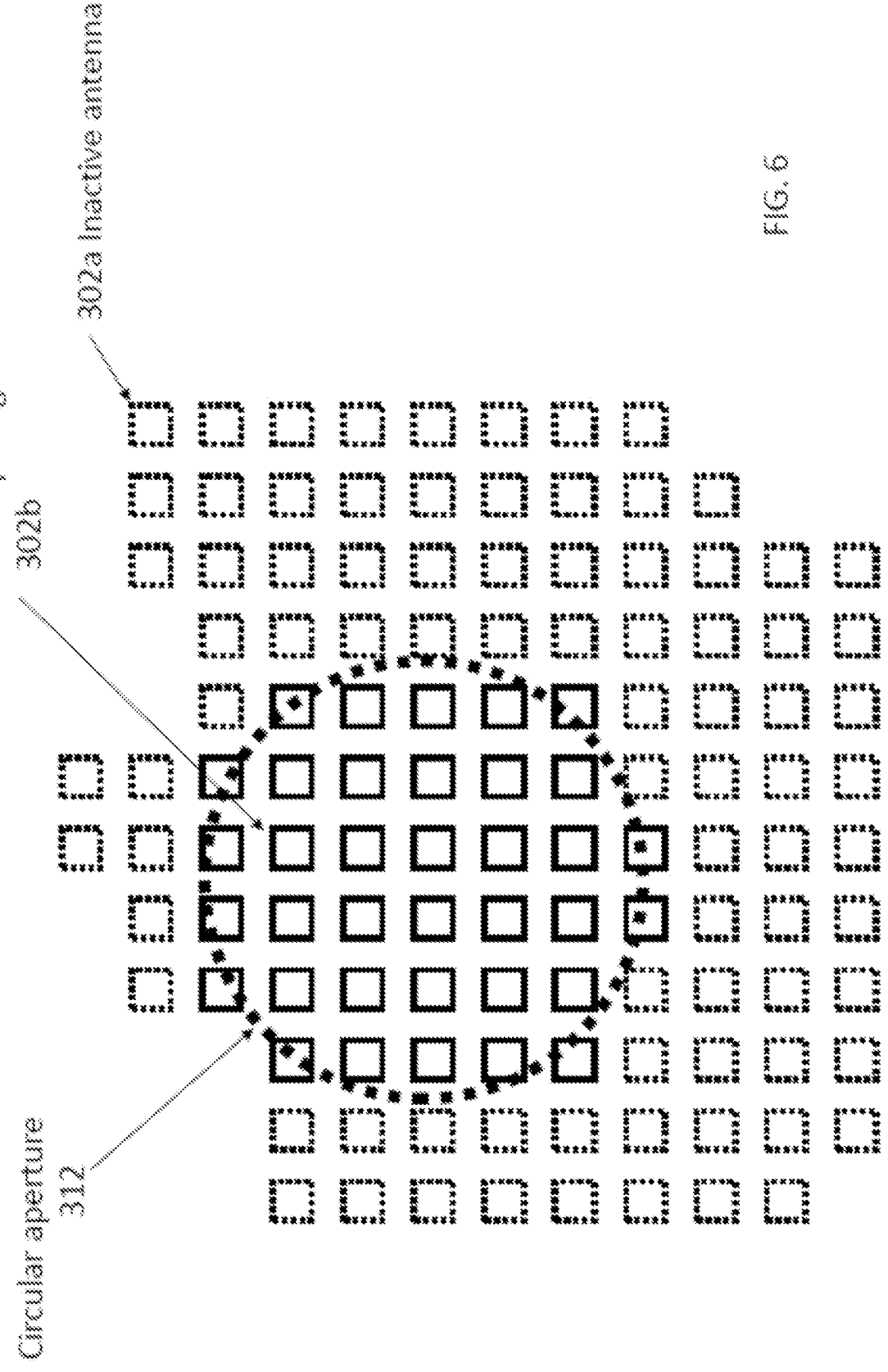
FIG. 6 is a plan view of the phased array of FIG. 5, showing a circular aperture.

In FIG. 6, a subset 312 of the antennas 332 of the phased array 300 found in FIG. 5 are shown that collectively are referred to as an aperture or antenna grouping. The antennas 332 within the aperture 312, which is circular as shown, take part in emitting RF radiation that sends a communication beam to the desired location on the ground. Any antennas 332 outside the circular aperture are not used in generating that specific beam.

Figure 7:
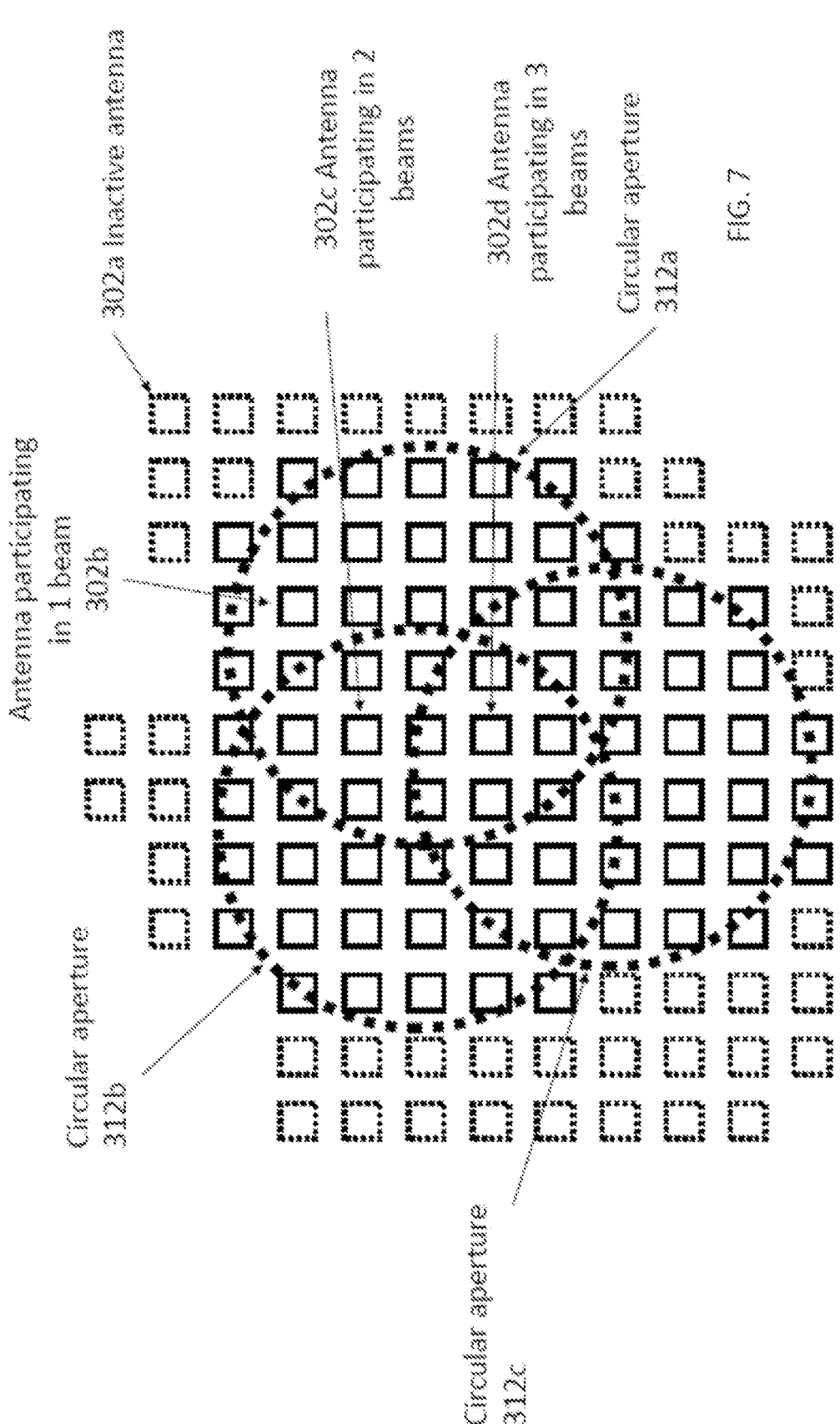
FIG. 7 is a plan view of the phased array of FIG. 5, showing multiple circular apertures.

In FIG. 7, three circular apertures 312*a*, 312*b*, 312*c* are contained within the same phased array 300 concurrently. This demonstrates how phased arrays can generate multiple beams by having antennas 332 simultaneously participate in the generation of multiple beams. As shown, a first antenna or first set of antennas 332 of a first individual respective small satellite 302*a* is outside of all of the apertures 312*a*, 312*b*, 312*c* and does not participate in the generation of any beams. A second antenna 332 of a second small satellite 302*b* is inside a first circular aperture 312*a* and participates in the generation of the first beam formed by the first circular aperture 312*a*. A third antenna 332 of a third small satellite 302*c* is inside the first circular aperture 312*a* and the second circular aperture 312*b*, and participates in the first beam formed by the first circular aperture 312*a* and the second beam formed by the second circular aperture 312*b*. And a fourth antenna 332 of a fourth small satellite 302*d* is inside the first, second and third apertures 312*a*, 312*b*, 312*c*, and participates in the generation of the first beam formed by the first aperture 312*a*, the second beam formed by the second aperture 312*b*, and the third beam formed by the third aperture 312*c*.

Figure 15:
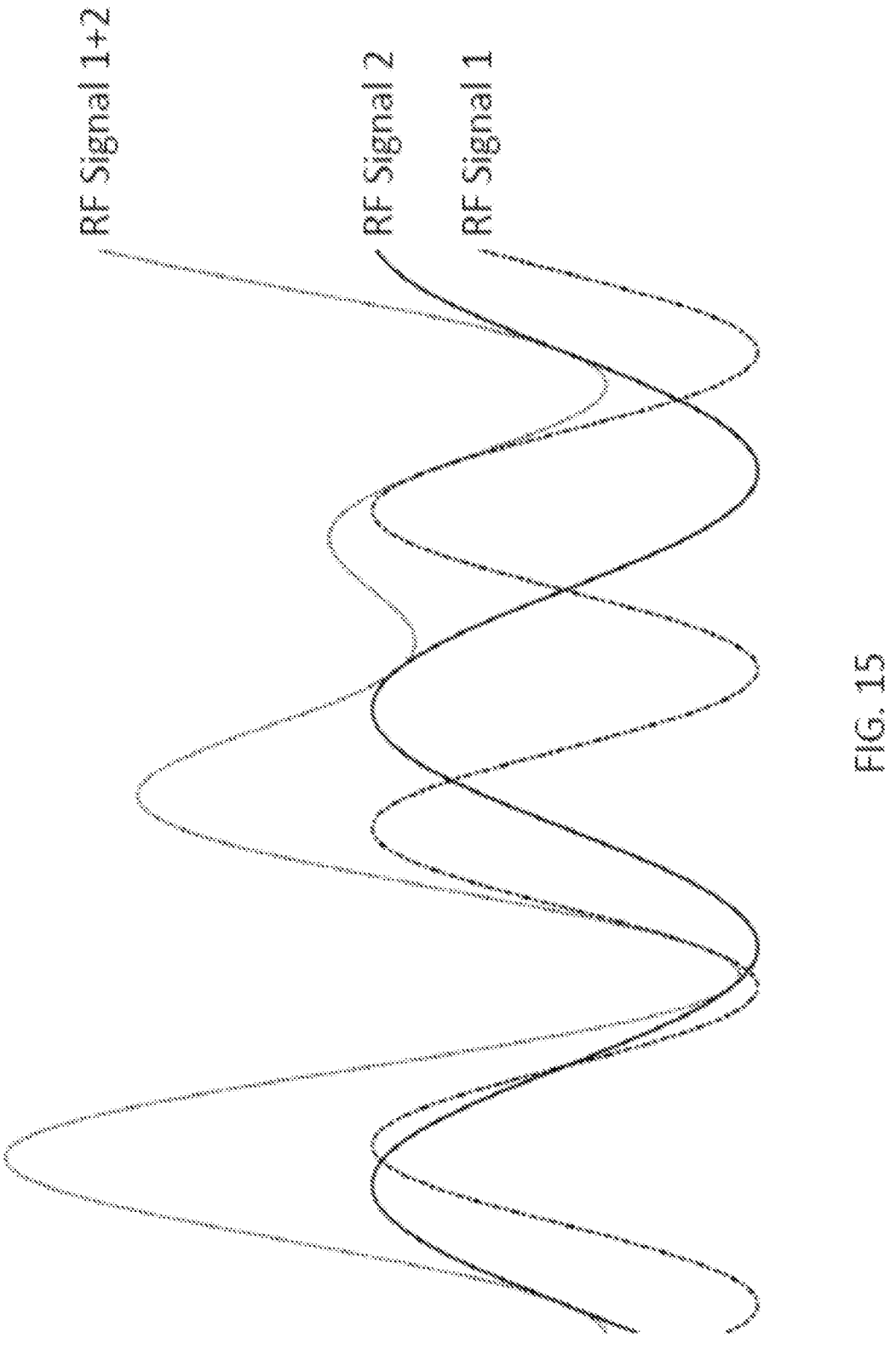
FIG. 15 is a chart showing multiple beams generated by a single antenna of a small satellite.
Figures 16A, 16B, 16C, 16D:
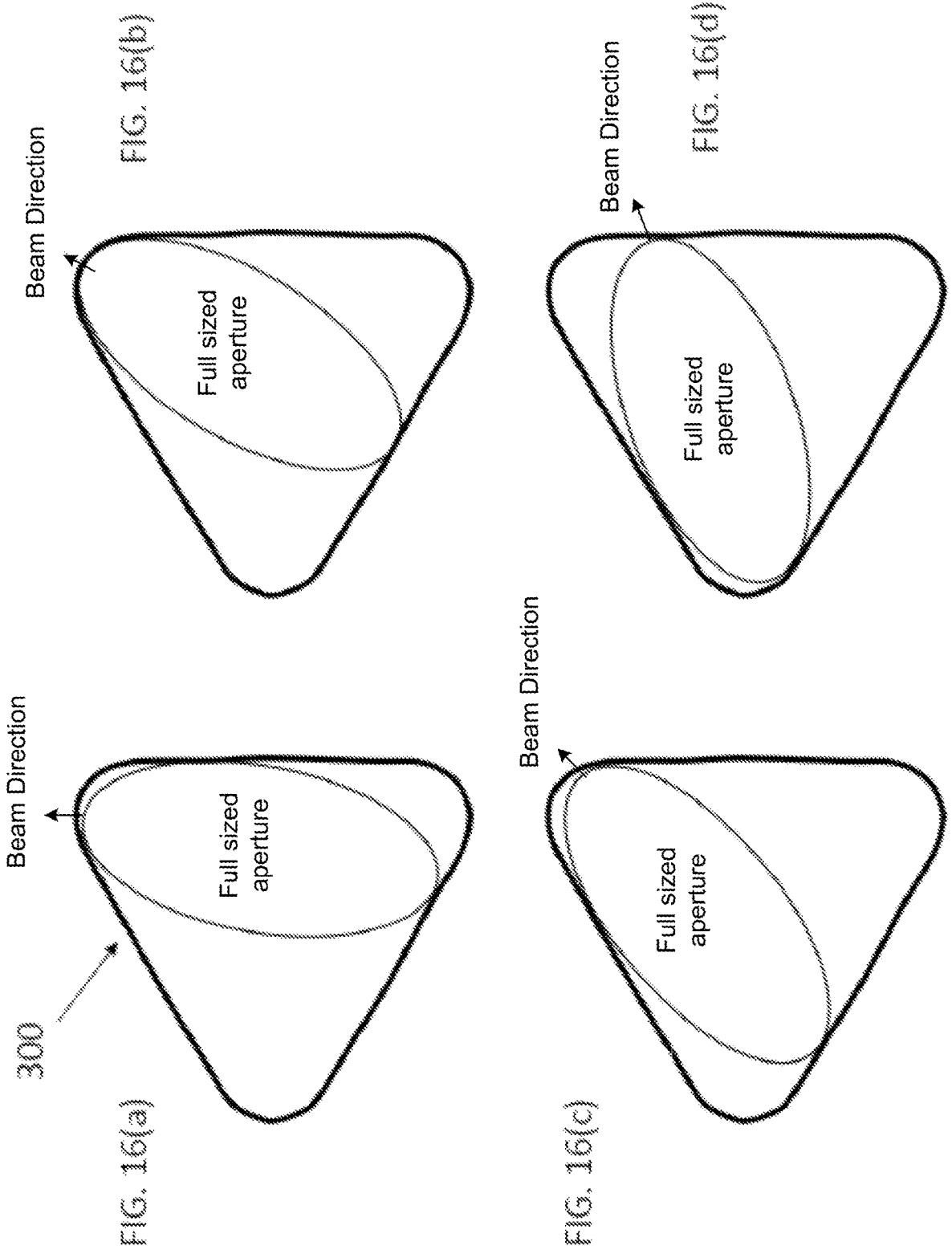
FIGS. 16(*a*)-16(*e*) show various elliptical apertures of varying size, shape, and direction for a rounded triangular array.
Figure 16E:
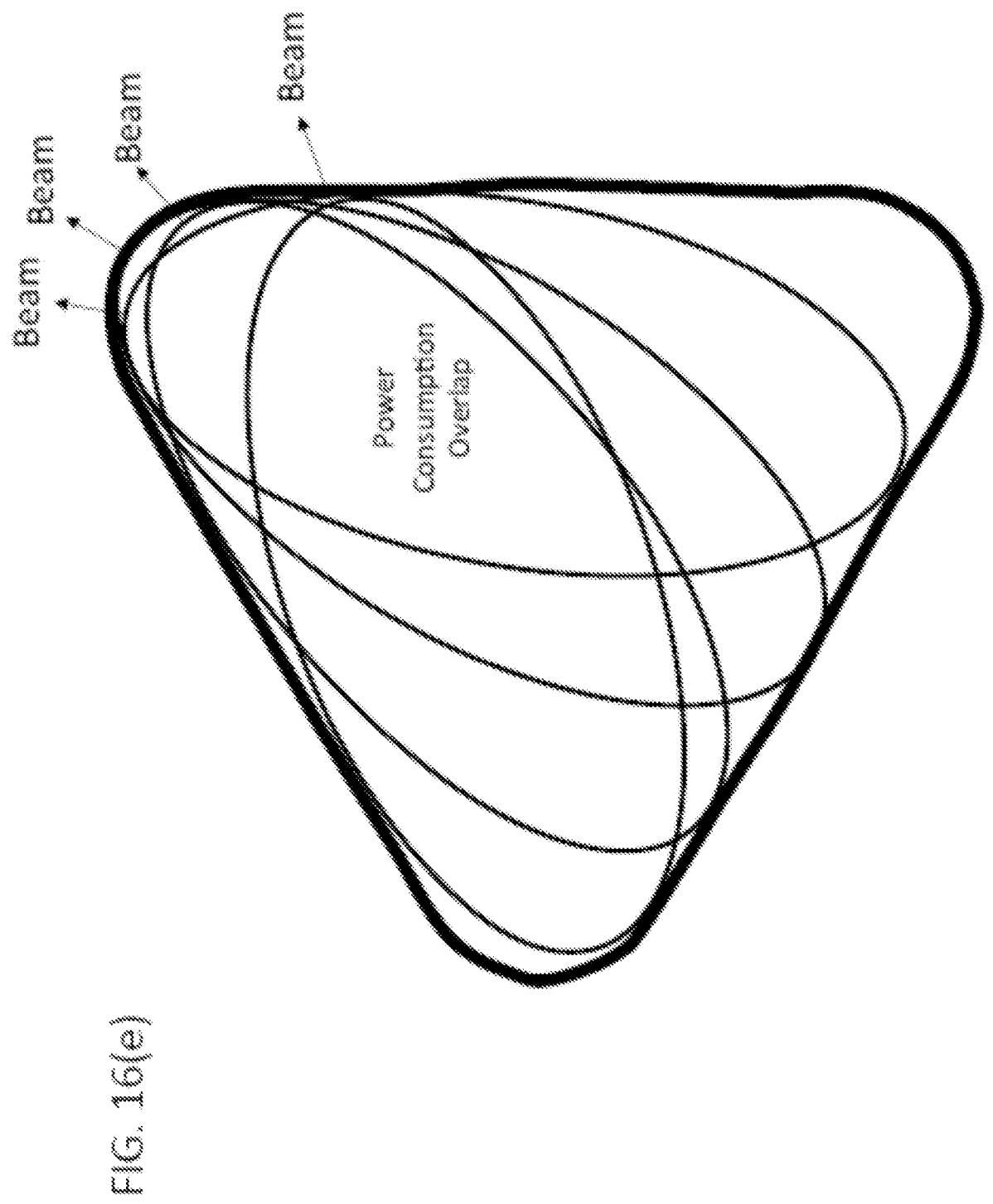

A single antenna 332 (FIG. 2(*b*)) of single individual small satellite 302 can be used as part of multiple subsets each of which form a separate beam, so that a single antenna 332 can be used to form multiple beams simultaneously. A single antenna 332 takes part in a single beam by producing an RF signal with a frequency, phase, and strength. The frequency of the RF signal is common across all the antennas 332 that are taking part in creating the beam. The phase and strength are determined by its position within the aperture. However, an antenna 332 can create multiple signals at once. FIG. 15 is a simplified illustration of how an antenna 332 can create two signals of different frequencies (RF Signal 1 and RF Signal 2) by simply combining the two signals and transmitting the combination (RF Signal 1+2). This process can be repeated for as many signals as the software and hardware driving the antenna can support.

A guiding principle of beamforming is that the aperture 312 shape determines the shape of the projected RF beam. A large aperture 312 will generate a tighter, more focused beam.

Similarly, an aperture 312 that is large in one dimension will generate a beam that is small along that same dimension. An aperture 312 that is tall and thin will generate a beam that is short and wide while an aperture 312 that is short and wide will generate a beam that is tall and thin. This principle is illustrated in the embodiments in FIGS. 12(*a*)-12(*d*) and FIG. 13.

Cells on the surface of the Earth are hexagonal by common convention of generating a grid delineating common service regions and a hexagonal cell grid on Earth is assumed for the purposes of this disclosure, though any suitable cell shape can be utilized. It is important to note that cells that are physically closer to the phased array will appear larger than cells that are physically farther from the phased array in a manner akin to depth perception. This means that servicing cells at the edge of a satellite's service range (the farthest cells) will require the largest apertures, while servicing cells underneath a satellite (the closest cells) will require the smallest apertures. Since all the apertures must fit within the phased array, the largest apertures are the drivers for the size that the phased array must be.

Another factor to consider is that due to the Earth being spherical, hexagonal cells that are farther away from the satellite appear (from the perspective of the satellite) to be hexagons that are compressed along one dimension. This is caused by the relative angle between the hexagon and the satellite and can be seen in FIGS. 9, 10, and 11. Thus, for cells that are beneath the array 300, a circular subset of antennas can be utilized; but the further the cell is from the array 300, the more elongated the subset of antennas are needed for the beam to match the compressed shape of the cell.

Figure 13:
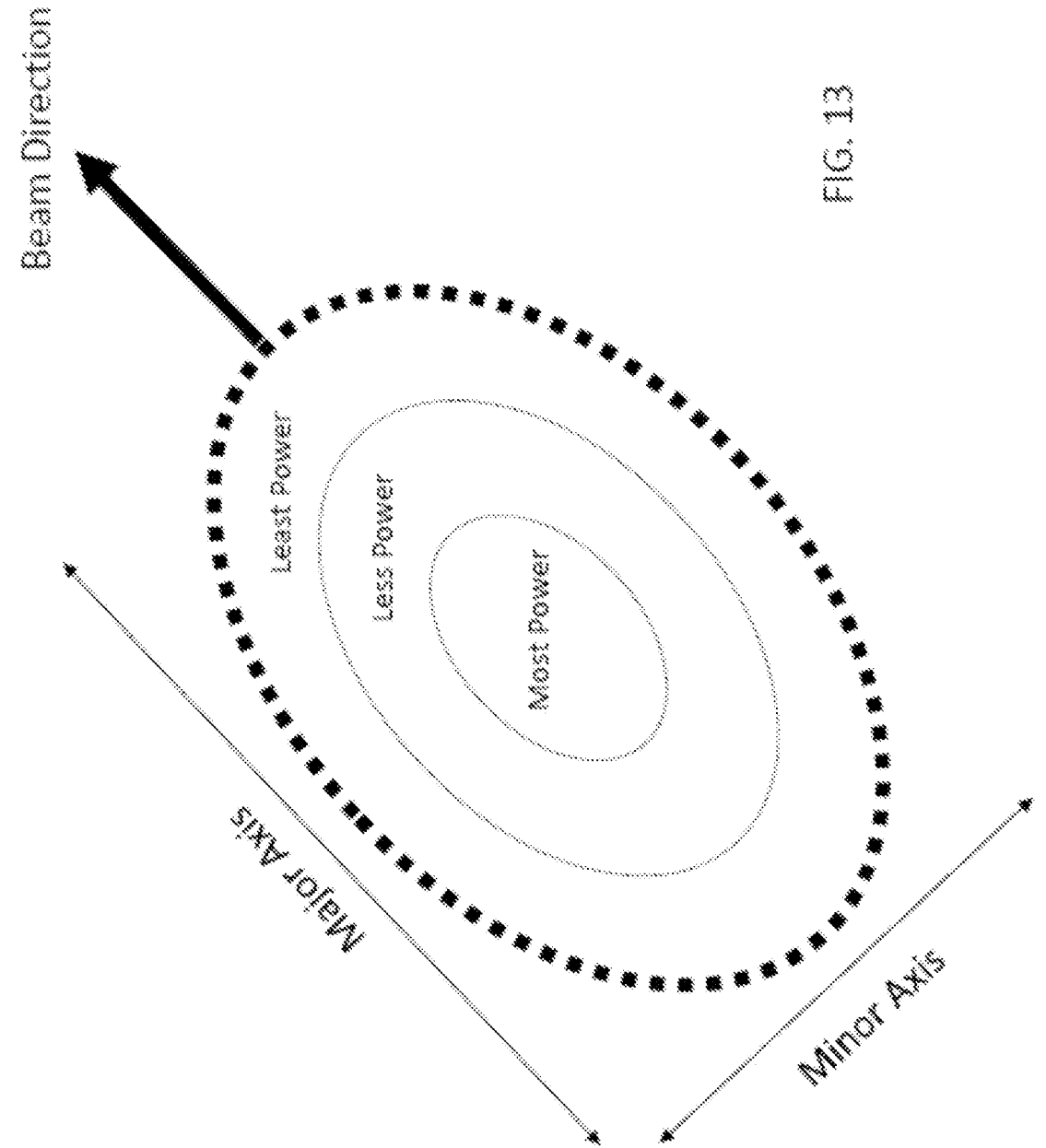
FIG. 13 shows the power distribution for an elliptical aperture.

Another characteristic of phased array apertures is in their power distribution. As seen in FIG. 13, apertures radiate the most power at their center. When a phased array uses multiple apertures simultaneously, if the aperture centers are overlapping, then the antennas 332 in that central region will need to radiate a large amount of power. If the aperture centers are varied in position, then the radiated power across the antennas 332 will be more evenly distributed. A more evenly distributed radiated power profile within a phased array is beneficial. That is, since the subsets of small satellites and the resulting apertures overlap the most in the center, the antennas of those small satellites will require the most power since they are generating the most beams. By varying the position of the apertures on the array, a more even power distribution is achieved. For example, small apertures can be placed at the outer regions of the array that are furthest away from the center of the array.

Figure 14:
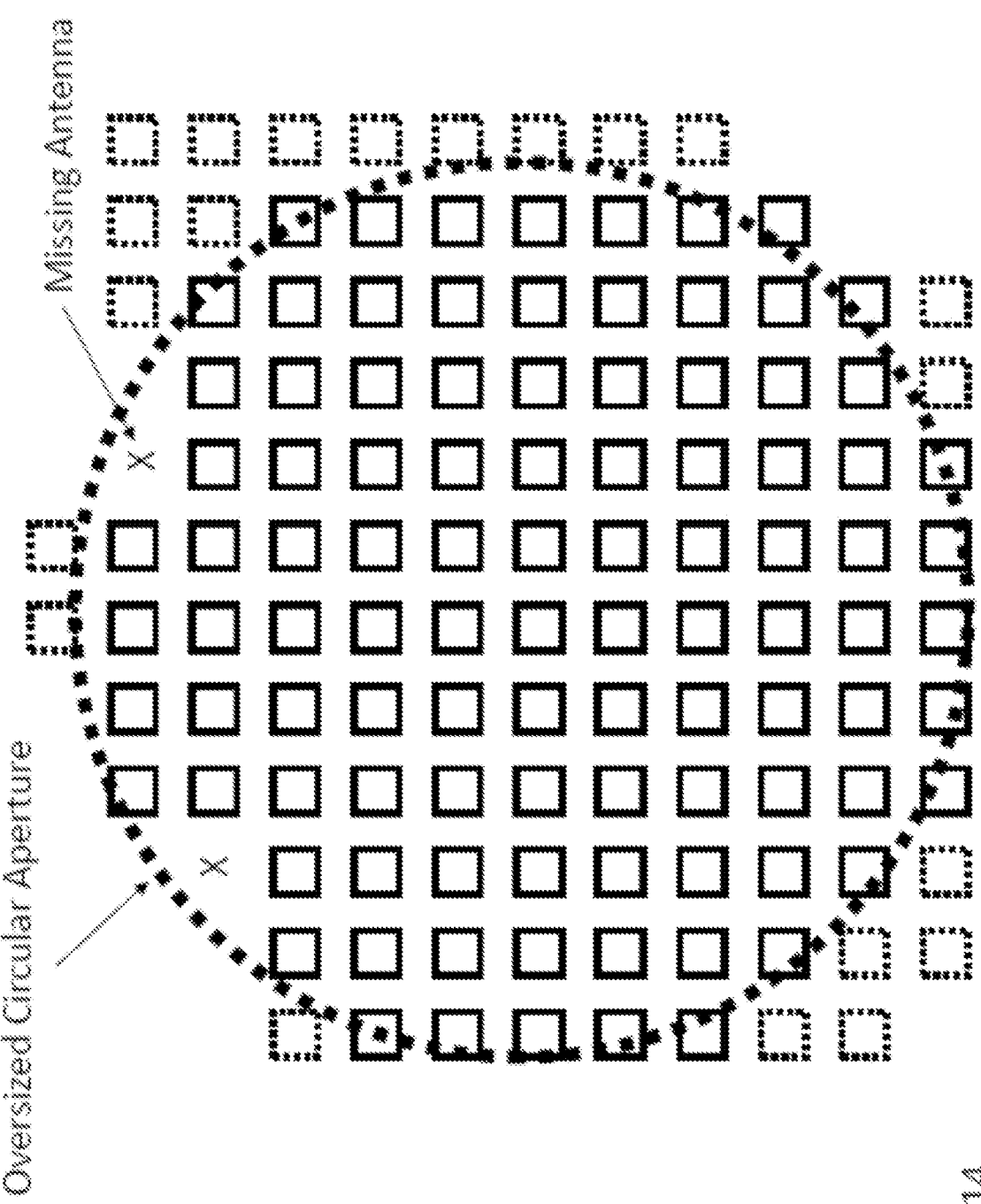
FIG. 14 shows an oversized circular aperture with missing antenna satellites.

In FIG. 14, we see an unacceptable definition for an aperture. The circular aperture shown exceeds the bounding shape of the phased array. In this scenario, the antennas 332 necessary to fill the circular aperture do not all exist, which severely degrades RF performance and is considered less desirable. As more antennas are missing, there is further degradation of performance, so each additional antenna missing makes performance worse (slower, less reliable, worse power efficiency). Eventually, (such as 1-10%, or 1-5% or more of missing antennas) the array cannot connect to users, which is unacceptable performance. In some embodiments, it is desirable to over-size the array a bit to handle unforeseen issues, such as bad weather, etc. But even an over-sized system has its limits.

Application in Phased Array Satellites

Figure 8:
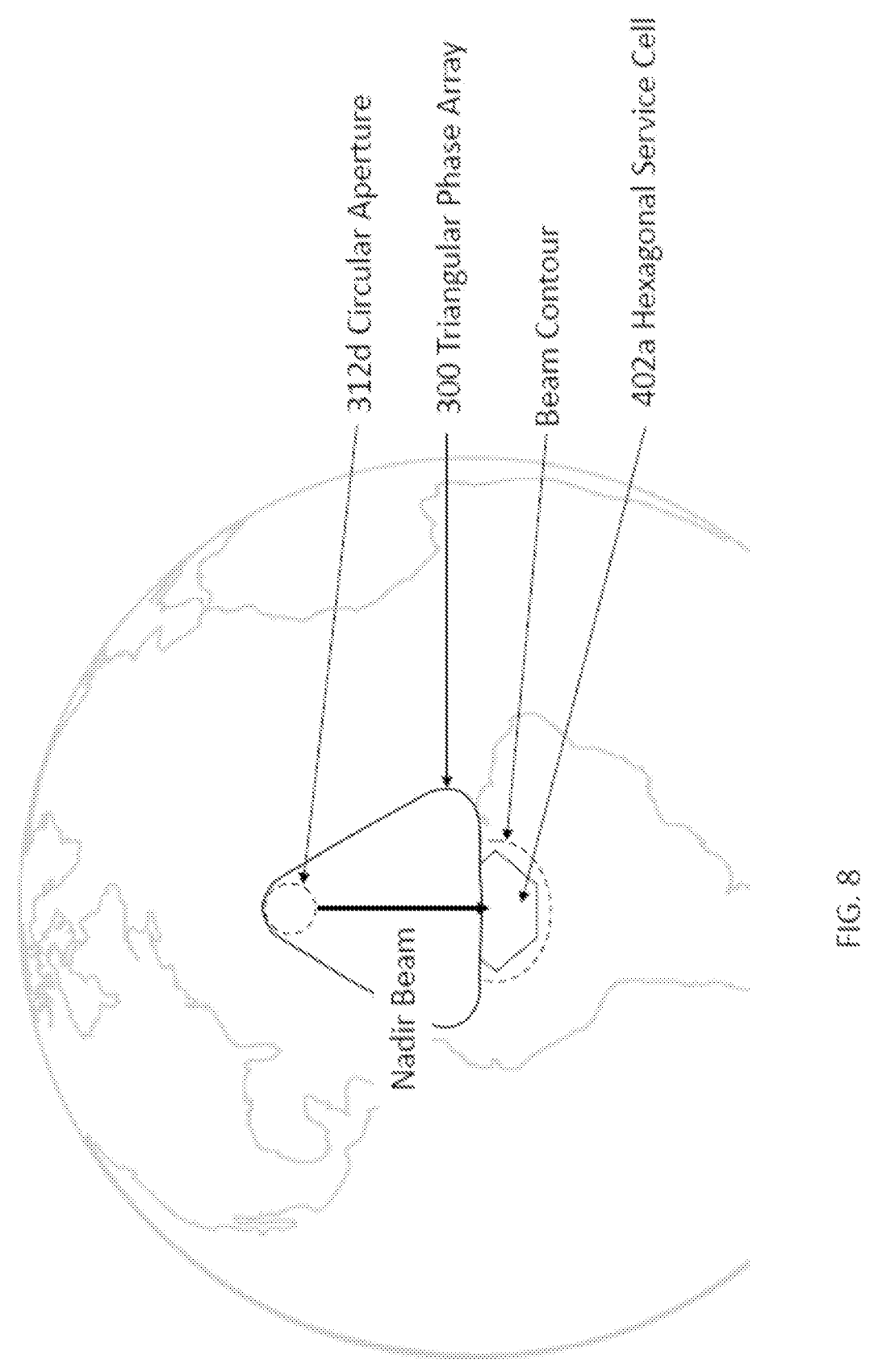
FIG. 8 is a view of a phased array having a rounded triangular configuration and a circular aperture with first beamforming characteristics (e.g., shape, size, phase, amplitude, frequency and power) and a first position (distance and direction), communicating with user equipment in a hexagonal service cell located near the array, in accordance with the present disclosure.

FIG. 8 is a view of a phased array having a rounded triangular configuration and a circular aperture with first beamforming characteristics (e.g., shape, size, phase, amplitude, frequency and power) and a first direction, communicating with user equipment in a hexagonal service cell at a first position (distance and direction) located near the array, in accordance with the present disclosure. The circular aperture (from FIG. 6) is used to generate a circular beam onto the surface of the Earth directly under the satellite. Because the cell 402*a* is directly underneath the satellite, the hexagonal cell is not distorted by the spherical shape of the Earth. This cell 402*a* is also physically close to the satellite and only a small aperture is needed. This means that a circular beam, and therefore a circular aperture 312*d*, are well suited to communicating with the hexagonal cell.

Figure 9:
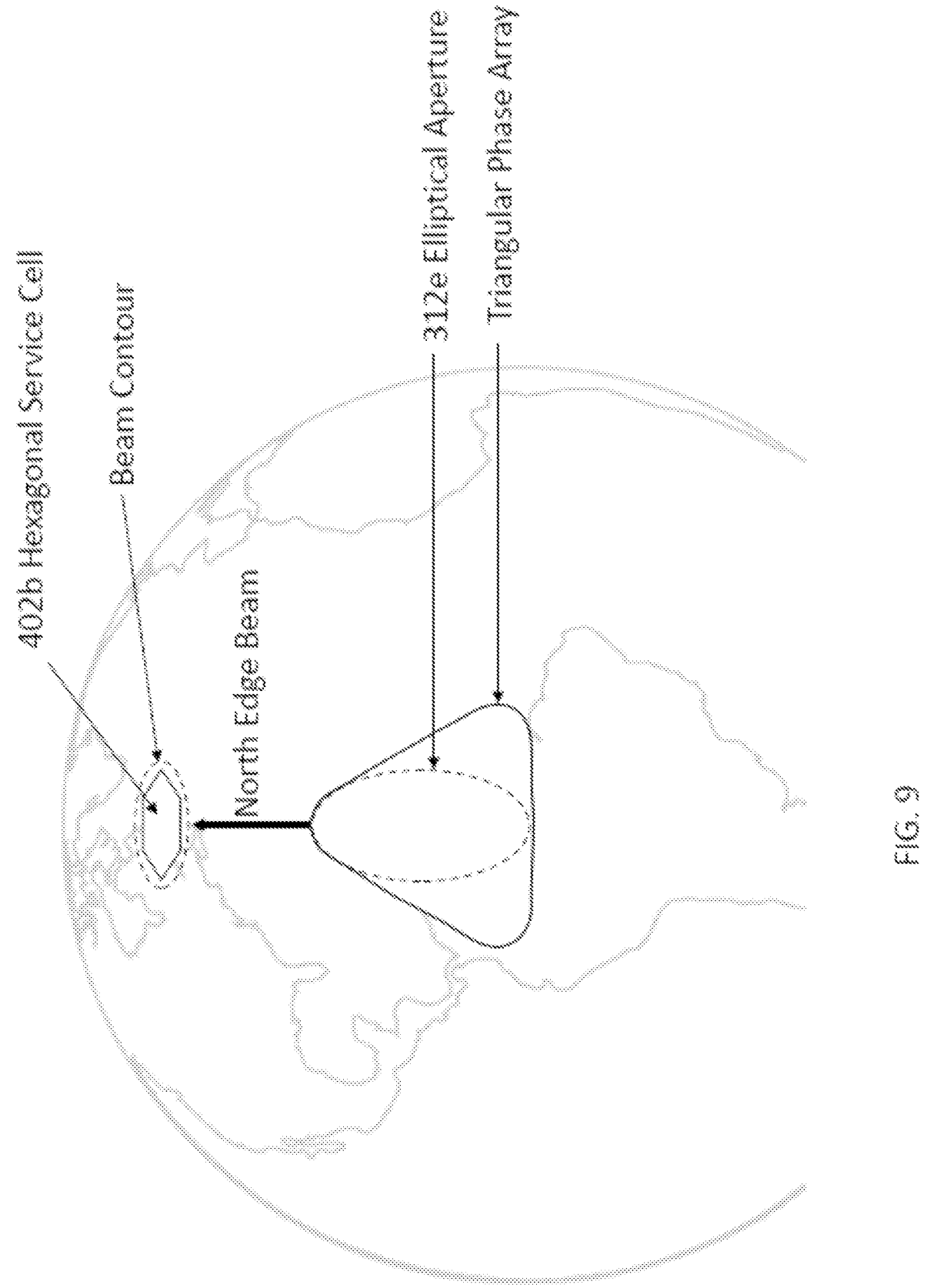
FIG. 9 shows the phased array of FIG. 8 having an elliptical aperture of second beamforming characteristics and second direction communicating with another hexagonal service cell at a second position north of the array.

FIG. 9 shows the phased array of FIG. 8 having an elliptical aperture of second beamforming characteristics and second direction communicating with another hexagonal service cell at a second position north of the array. Since the compressed hexagonal cell 402*b* is further away from the array 300 than the cell shown in FIG. 8, the cell 402*b* appears (with respect to the array 300) to be wide and short. Thus, an elliptical aperture 312*e* is selected as tall and thin, which projects a beam that is wide and short to match the cell 402*b*. Here, the aperture 312*e* extends from, and is aligned with, the top corner of the array 300 (so that the radius of curvature of the aperture 312*e* substantially matches the bounded rounded top corner of the array 300) straight down to the center of the bottom side of the array 300. This permits the phased array 300 to properly serve the cell 402*b* with a single beam.

Figure 10:
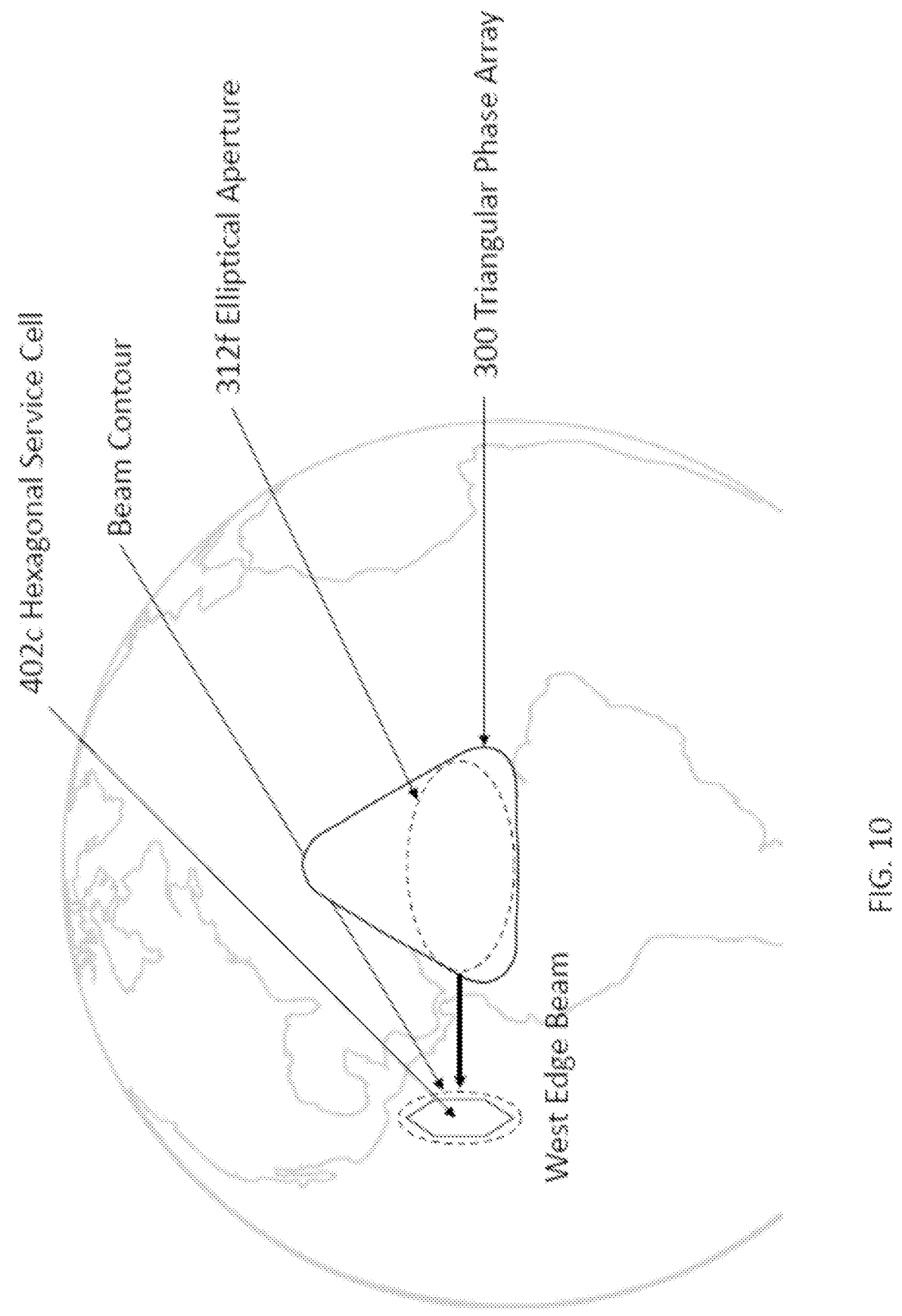
FIG. 10 shows the phased array of FIG. 8 having an elliptical aperture of a third beamforming characteristics communicating with another hexagonal service cell at a third position west of the array.

FIG. 10 shows the phased array of FIG. 8 having an elliptical aperture of a third beamforming characteristics communicating with another hexagonal service cell at a third position west of the array. This is the same situation as FIG. 9 except that the cell 402*c* is at a different angle relative to the phased array orientation. Since this compressed hexagonal cell 402*c* appears to be tall and thin (with respect to the array 300), the elliptical aperture 312*f* is selected as wide and short, which projects a beam that is tall and thin to match the cell 402*c*. Here, the aperture 312*f* has a longitudinal axis that is substantially parallel to the bottom side of the array 300. This permits the phased array 300 to properly serve the cell 402*c* with a single beam.

Figure 11:
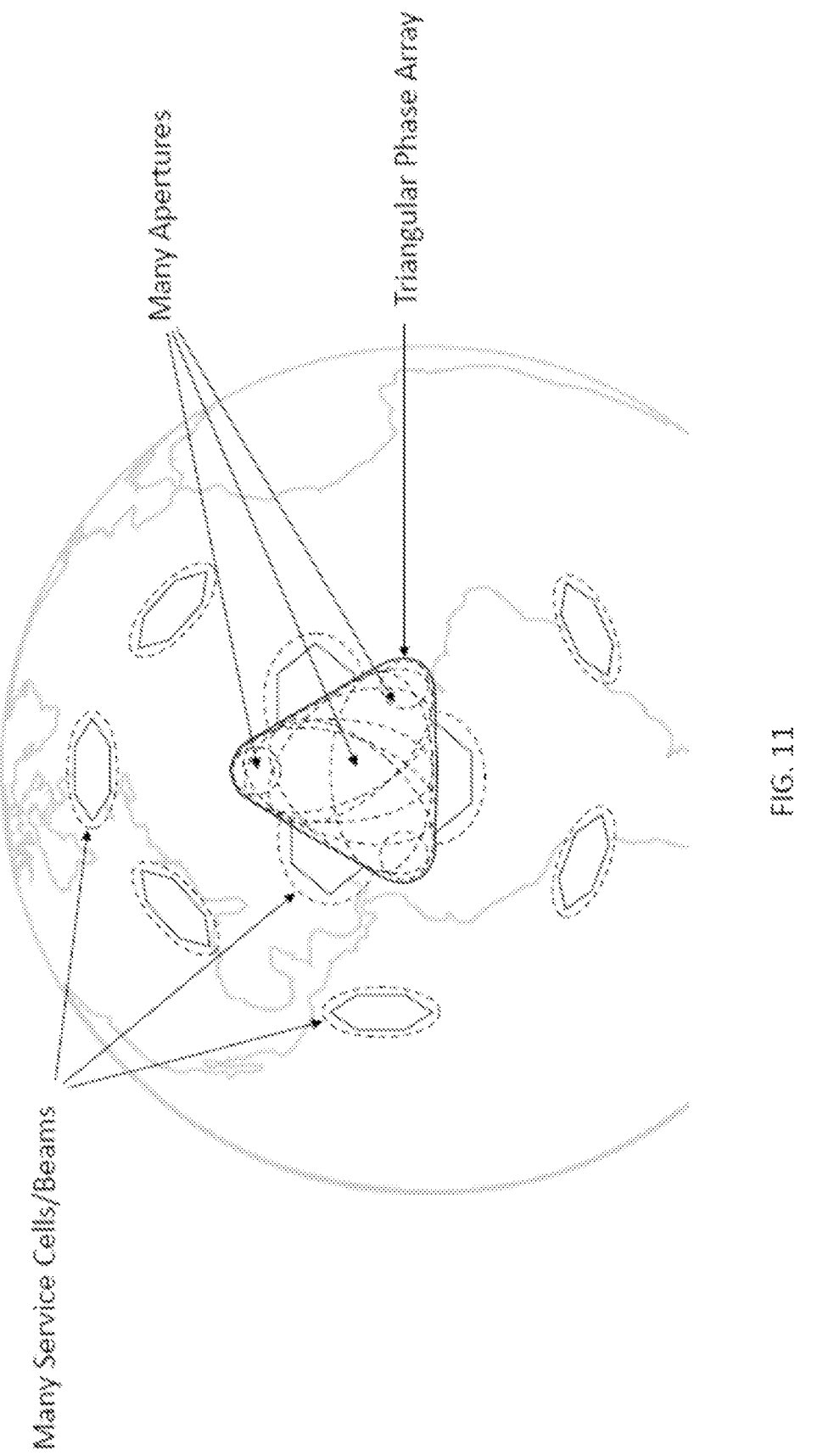
FIG. 11 shows the phased array of FIG. 8 having multiple elliptical and circular apertures of varying beamforming characteristics communicating with various hexagonal service cells at different distances and directions relative to the array.

FIG. 11 shows the phased array of FIG. 8 having multiple elliptical and circular apertures of varying beamforming characteristics communicating with various hexagonal service cells at different distances and directions relative to the array. FIG. 11 shows a phase array generating many elliptical and nadir beams, all with the same phase array. Many of the antennas within the phase array are participating in the creation of multiple beams. As shown in FIGS. 8-10, the first, second and third beamforming characteristics differ from one another depending, for instance, on the size and shape of the cell, and the distance and position of the cell to the satellite; though certain beamforming characteristics may be the same (for instance, the size and shape may be the same for cells that are equal distance from the array, but in different directions).

As further illustrated by FIGS. 8-11, the location of the apertures 312 on the array can be selected based on the size and position of the aperture 312, and it is possible that the desired apertures 312d-312f can be achieved at one or more locations on the array 300. For example, in FIG. 8, the circular aperture 312d is relatively small with respect to the size of the array 300, and so the aperture 312d can be positioned at any number of locations on the array 300. The aperture 312d is shown at the top rounded corner (in the embodiment shown) of the array 300 since the small satellites 302 at the outer portions of the array 300 are less utilized than the small satellites 302 located toward the center of the array 300. Accordingly, the small satellites 302 at the outer portions of the array 300 are utilized whenever possible, such as to communicate with cells beneath the array 300. However, the circular aperture 312d can instead be formed at any of the other corners of the array 300, along one side of the array 300, or at an more centered position on the array 300.

In comparison, the apertures 312e, 312f shown in FIGS. 9, 10 are larger, and might only be possible at a specific location on the array 300. The further a cell 402 is from the array 300, the larger (for more power) and more elongated (to cover the compressed hexagonal shape of the cell) the aperture 312. For example, a cell located between cell 402b and the array 300 (i.e., a cell closer to the array than cell 402b), the aperture 312 is more rounded (less elongated) and smaller, and can be formed at other positions on the array 300 other than the one shown in FIG. 9.

By extending the concepts of FIG. 11 to hundreds or thousands of simultaneously transmitted beams, it can be seen that serving cells around the entire edge of a satellite's service region will require elliptical apertures that point in nearly every direction. This is one main principle for the design of a phased array 300, i.e., it must have a shape that is sufficient to permit all necessary apertures shapes. In this case of satellites serving hexagonal cells on the surface of the Earth, the phased array shape must be designed to permit elliptical apertures in every direction. The phased array design can be configured to minimize the number of antennas 332 (and small satellites 302) required to build the phased array. This means that a bounding shape (representing the phased array) that can contain all necessary sub-shapes (elliptical apertures) while having the minimum possible area and small satellites 302.

The eccentricity of the elliptical aperture, and therefore its major-to-minor axis ratio (major axis length divided by minor axis length), is determined by the degree of apparent compression of the cells at the edge of the satellite's service range. Satellites that serve only the regions immediately below the satellite will require mostly circular apertures due to limited apparent cell compression. Satellites that serve wider regions of cells will see cells at the edge of their service range that are increasingly compressed, thus necessitating elliptical apertures with increasing eccentricity and major-to-minor axis ratio.

Phased Array Shape

The phased array 300 must contain all elliptical apertures, and the question remains what phased array shape to provide. Phased arrays are classically square, circular, hexagonal, or resemble features of all three. For a satellite where the largest apertures are elliptical, a rounded triangular phased array shape requires less area and therefore fewer small satellites 302 than other configurations. Thus, the phase array 300 has a triangular shape to form apertures that are ellipses. FIGS. 16(a)-(e) show elliptical apertures (with beam directions) fitting into a triangular phase array 300. The rounded triangular shape for the array 300 is counterintuitive and unexpected since it does not match the shape of the hexagonal cells 402, and does not match the shape of the square small satellites 302, and does not match the shape of the circular or elliptical beams, and does not match the shape of the circular or elliptical apertures.

Figures 12A, 12B, 12C, 12D:
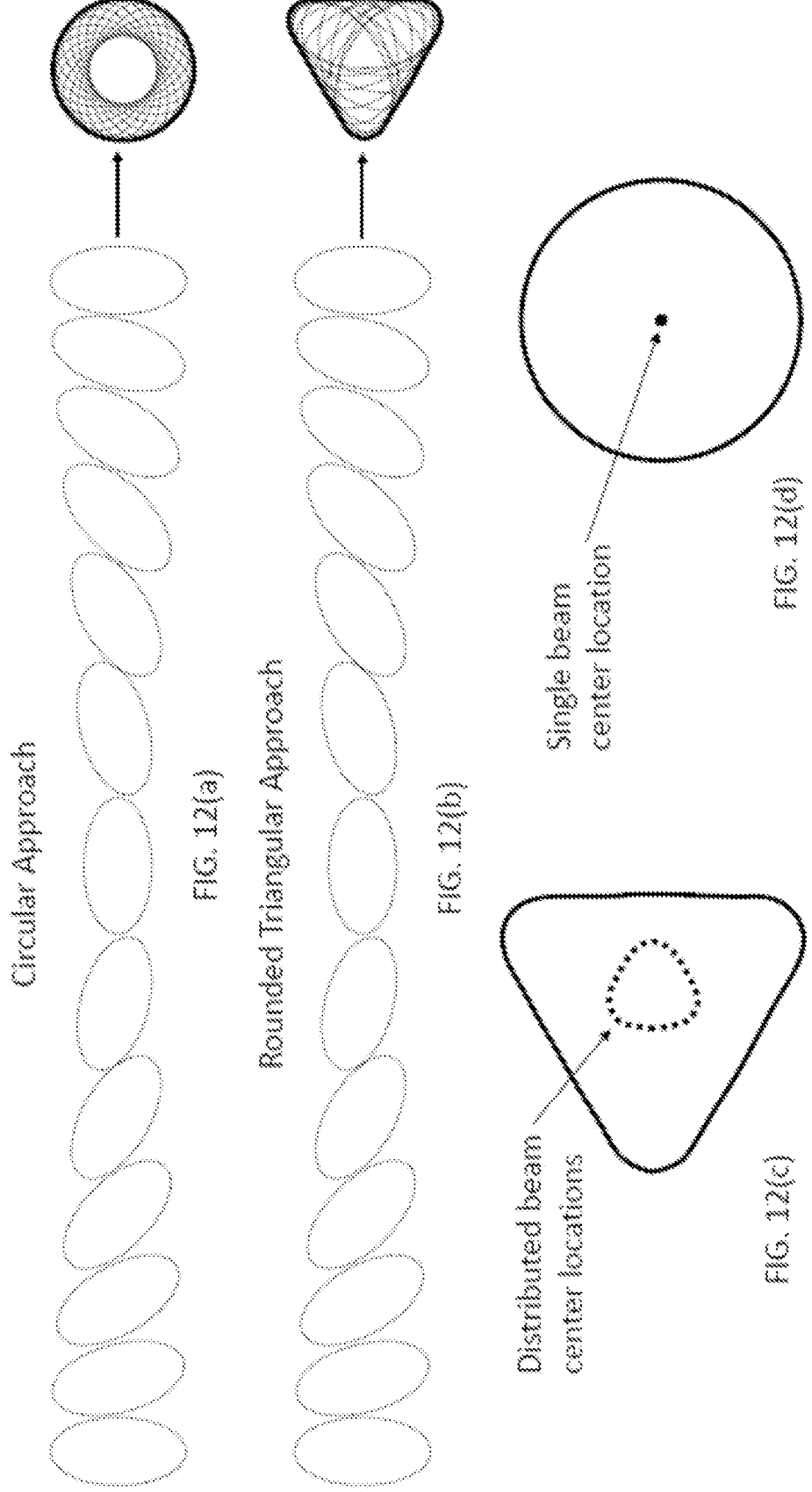
FIG. 12(a) show various examples of elliptical apertures for a circular array.
FIG. 12(b) show various examples of elliptical apertures for a rounded triangular array in accordance with the present disclosure.
FIG. 12(c) shows the distributed beam center locations for the rounded triangular array of FIG. 12(b)
FIG. 12(d) shows the distributed beam center location for the circular array of FIG. 12(a)

As seen in FIGS. 12(a)-(d), a series of ellipses with major-to-minor axis ratio (major axis length divided by minor axis length, see FIG. 13) of 2 are shown being packed into both a circular phased array and a rounded triangular phased array. A ratio of 2 was used as a representative example of a suitable ratio, but larger and smaller ratios can be utilized, and a range of one (1) (for a circle) to 2 or 3 may be suitable for most applications, and in some embodiments a ratio of 1.5 or more is provided. And in one embodiment, the shape is a rounded equilateral triangle with corners having 3 substantially congruent internal angles of approximately 60 degrees. The corners are rounded to have a semi-circular shape that corresponds with the opposite ends of the elongated ellipses. The radius of curvature of the rounded tips can be close to the minimum radius of curvature of the elliptical apertures that the rounded triangle is designed around. As shown in FIG. 9, the top of the elliptical aperture substantially fits into the tip of the rounded triangle. The ellipses illustrate a grouping (or subsets) of antennas 332 used to form a single beam. The phase arrays in FIG. 12 on the right-hand side need to be of sufficient size/shape that each elliptical grouping of antennas actually exists. It is noted that thirteen (13) elliptical subsets are illustrated in the embodiment of FIG. 12(a), each having a major-to-minor axis ratio of 2. However, more or fewer subsets can be utilized, the major-to-minor ratio can be greater or less than 2, and/or each subset can have a unique major-to-minor axis ratio.

Figures 17A, 17B:
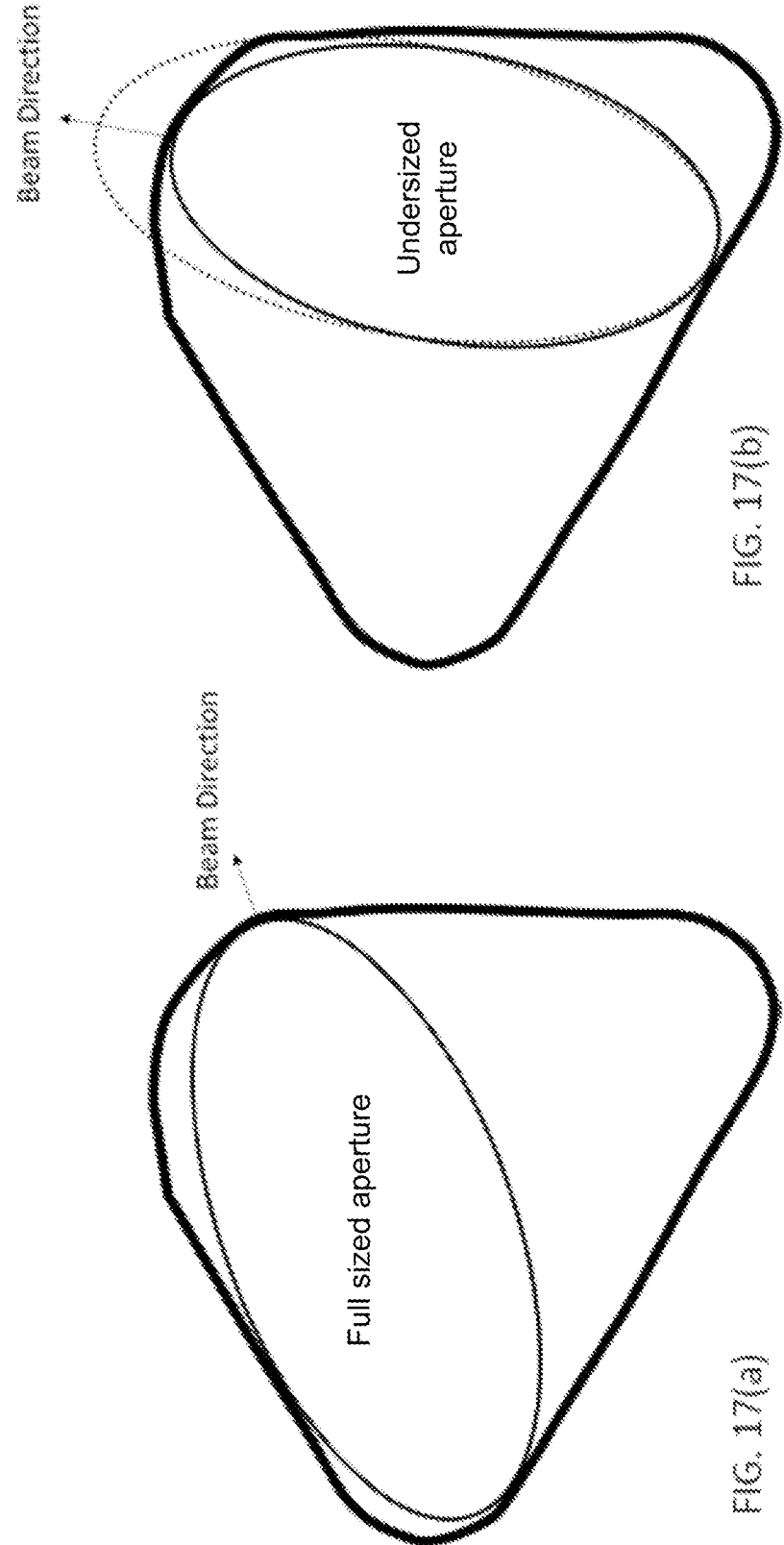
FIGS. 17(*a*), 17(*b*) illustrate what happens when the phase array is not sufficient in size/shape to allow all of the elliptical groupings of antennas to exist.

FIGS. 17(a), (b) illustrate what happens when the phase array is not sufficient in size/shape to allow all of the elliptical groupings of antennas 332 to exist. The dashed ellipse cannot fit within the phase array shape. If you tried to find a grouping of antennas 332 in the shape of the dashed ellipse, you could not do it. The impact of this could be seen as trying to create an antenna with a big part of it missing. Beams sent in some directions are not impacted (the full-sized aperture in a different beam direction), but those that are affected will either have beam quality degradation or an undersized aperture can be used, leading to an under-focused beam. So that the above situation is avoided, we need to add enough phase array antennas 332 of small satellites 302 so that each elliptical grouping of antenna can exist.

The rounded triangular shape accommodates the ratio between the elliptical aperture area and the phase array area. The elliptical aperture area/size determines how focused a beam can be, which in turn determines how far away a service cell can be from a satellite and still be served and/or how small a service cell can be.

Satellites that are capable of forming beams to service cells farther away will increase their coverage range as a result. Alternatively, satellites that are capable of forming more focused beams to service cells can permit those service cells to become smaller, causing each beam to be shared by fewer users and improving service quality. The cost of manufacturing and launching phase array satellites is a function of their size. The productivity of a phase array satellite is a function of the aperture size they can support. The size and shape of the phase array maximizes the productivity per cost of a phase array based on the aperture area supported relative to the phase array area, and the field of view covered by the array.

An elliptical aperture with a major-to-minor axis ratio of 1 is equivalent to a circle and a rounded triangular phase array becomes circular because of the rounding. As noted, elliptical apertures are required when planar phase array satellites form beams towards service cells on Earth's surface below the satellite. Apertures with larger major-to-minor axis ratios (greater eccentricity) are a result of larger distances to the service cells. For a major-to-minor axis ratio of 2, the triangular phase array will require only 92% of the area that a circular phase array requires when supporting elliptical apertures of equal area. This means that with respect to phased arrays which generate elliptical apertures of major-to-minor axis ratio of 2, those crafted according to the model of the rounded triangular model can be created using 8% fewer total antennas 332 than those crafted according to a circular model. For phased arrays 300 generating elliptical apertures of major-to-minor axis ratio of 3, the rounded triangular model requires 16% fewer total antennas than the circular model. For phased arrays generating elliptical apertures of major-to-minor axis ratio of 5, the rounded triangular model requires 23% fewer total antennas than the circular model. A ratio greater than 1.5 corresponds to an eccentricity between approximately 0.75 and 1.

A secondary benefit of the rounded triangular model is in the distribution of radiated power across the small satellites 302. As noted, and shown in FIG. 13, the radiated power is greatest at the aperture center. When many elliptical apertures are contained within one phased array, the circular model causes all the elliptical aperture centers to be co-located as shown in FIG. 12. However, the rounded triangular model causes the elliptical aperture centers to wander as shown in FIG. 12, which more evenly distributes the radiated power across the antennas 332. This is generally beneficial for phased array performance. The peak point of power consumption in the aperture is in the center and those centers are co-located with a circular phase array and not co-located with a rounded triangular array, as shown in FIG. 12.

The triangular array is implemented by having a 2-D area filled with antennas 332. Many small satellites 302 are next to each other that, together, are the phase array 300. Multiple antennas 332 are arranged into a 2-D area (i.e., a flat array having a planar surface of antennas) and that area is an approximation of a rounded triangle, i.e., a triangle in which the 3 corners or points are rounded to align with the shape of the elliptical beam. This is an approximation because mechanical considerations and practical limitations generally limit the ability to create an exact shape. The antenna 332 is the finest grain of resolution. As you add more and more antennas, then you can get closer and closer to your desired triangular shape. But a partial antenna cannot be used on the edges/corners of your triangle because a partial antenna doesn't function properly.

Figure 18A:
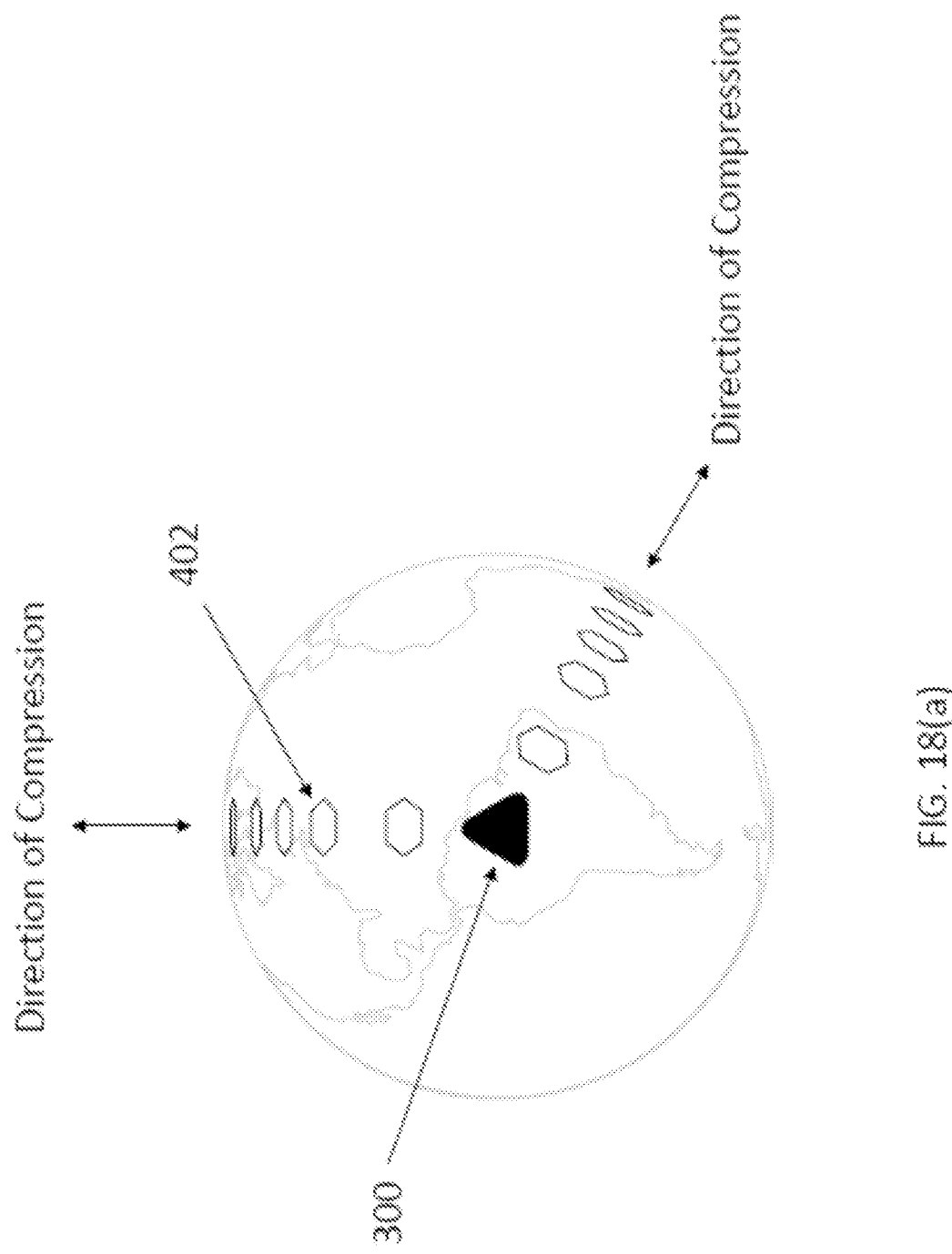
FIGS. 18(*a*)-18(*e*) illustrate apertures having different sizes, shapes and directions that are needed to communicate with hexagonal cells that are at varying distances and directions from the array and cell compression with respect to the array.

FIGS. 18(a)-18(d) further illustrate the scope of the disclosure. FIG. 18(a) shows that hexagonal cells 402 on the surface of the Earth can become compressed from the viewpoint of the satellite array 300. This occurs when the cells 402 are farther from the satellite array 300, due to the sphere-like shape of the Earth. To get beams that conform to this compressed shape, apertures at the array 300 are required to be elongated in the relevant direction.

Figures 18B, 18C:
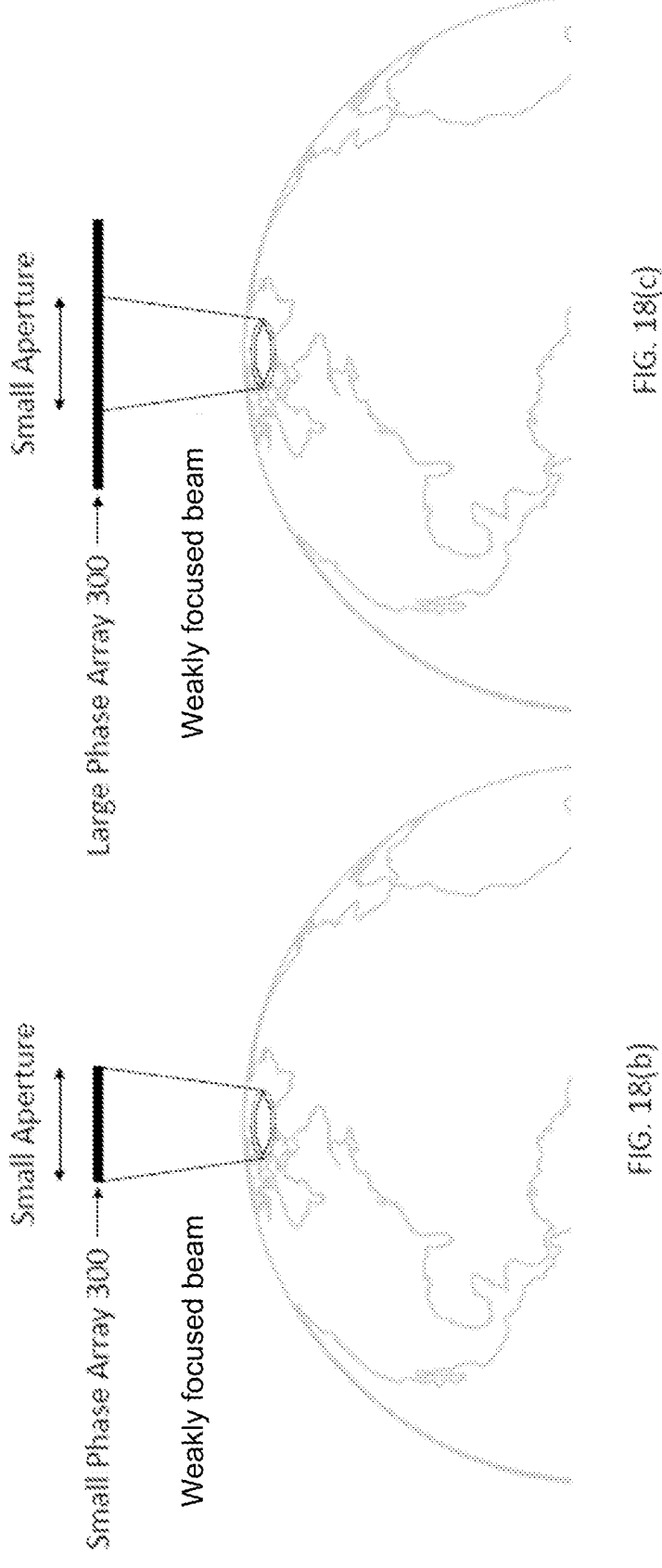

FIGS. 18(b)-18(e) illustrate that the aperture size used in the relevant dimension determines how focused a beam is in that dimension. FIGS. 18(b), 18(c) show that nadir beams do not require excessive focusing, so small apertures can be used at the array 300 because only weakly focused beams are required for the antennas 332 of the satellite array 300 to be able to directly communicate with UE on the ground. In fact, a larger aperture would over-focus a beam and that beam would miss the outer perimeter of the service cell (customers would not receive an RF signal). The large phase array is not required because only a small aperture is used. In this case, both small arrays (FIG. 18(b)) and large arrays (FIG. 18(c)) are large enough to support small apertures and form the appropriately focused beam.

Figures 18D, 18E:
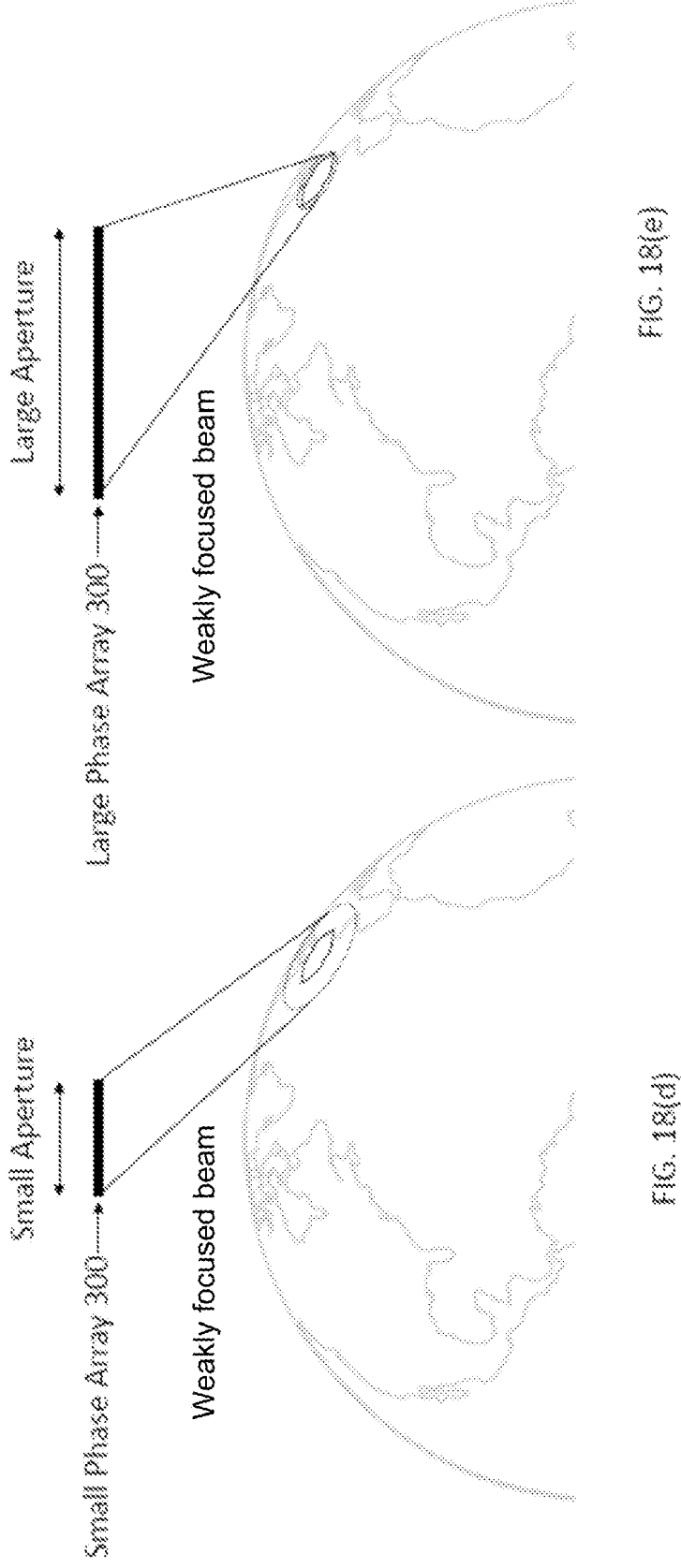

FIGS. 18(d), 18(e) show that edge beams do require more focusing relative to FIGS. 18(b), 18(c). This increase in focusing is required both due to greater distance to the service cell and the compression caused by the geometry of service cells on the sphere-like Earth. This means that small arrays (FIG. 18(d)) which are only capable of supporting small apertures are insufficient and the beam exceeds the desired service cell region, causing interference, wasted energy, and poor service quality to the user. Large arrays (FIG. 18(e)) are capable of supporting large apertures and the highly focused beam that results will match the service cell, providing good service quality to the user. Thus, compression due to the sphere-like Earth requires elliptical apertures (apertures larger in one dimension than the other) and the ellipses can be in any direction.

Figure 21:
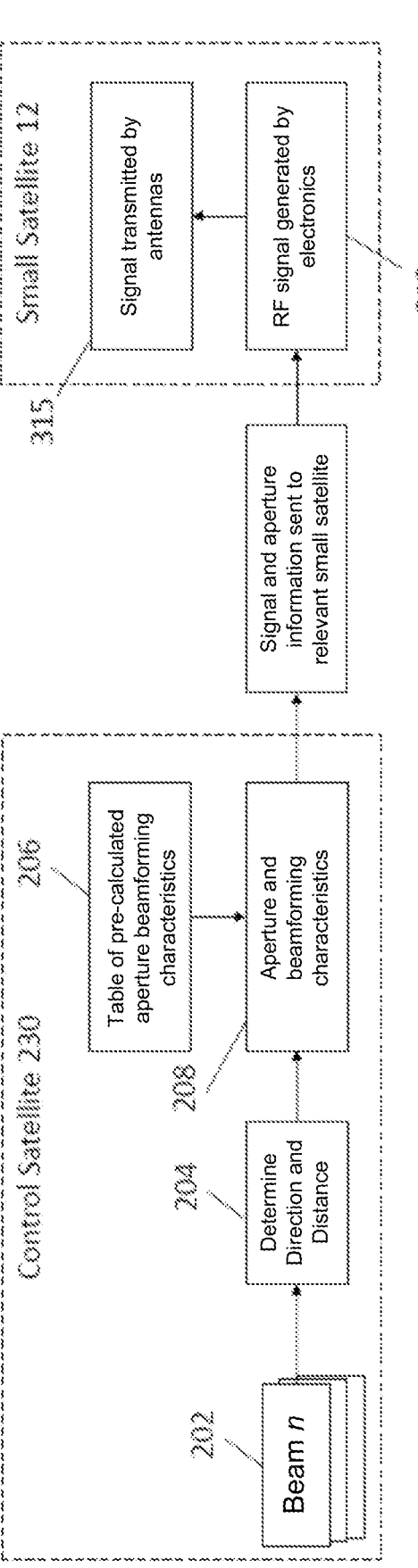
FIG. 21 is a flow diagram of operation of a control satellite and small satellite in accordance with the present disclosure.

FIG. 21 is a flow diagram of the general operation of the satellite communication system in accordance with one illustrative nonlimiting embodiment of the present disclosure. As shown, a centralized processing device 230, such as at the control satellite 200, has beam data 202 of which beams are to be formed based on the real operating conditions of the satellite phase array. How those beams are to be formed (which aperture type to use) is established by the control processing device through real-time calculations or from a pre-calculated means, such as from a lookup table stored in a storage device such as memory. The direction, size and distance 204 of the service cell relative to the satellite determine, step 208, the size, shape and direction of the aperture that should be used to match the beam profile to that of the service cell.

This can be achieved through a pre-calculated table 206 that describes many apertures that will form beams in varying direction and beamwidth (focusing). The pre-calculated table 206 can also, for example, include the placement of the apertures within the array, indicating which specific antennas are used. Thus, the lookup table takes as an input the direction and distance of the service cell (with a known size) and then the output is a fully defined aperture. Alternatively, the placement of apertures within the array can be left as an additional step that is dynamically performed by the control satellite processor 230 in real time to improve the distribution of power across the phase array antennas based on the control satellite processor knowledge of the full set of beams that are being used at that moment in time. The control satellite processor 230 transmits the aperture to be used and the beamforming characteristics (phase, frequency, signal strength (e.g., amplitude), power etc.) to the small satellites 302, such as to the small satellite processing device 12. The small satellite processing device 12 processes the information received, generates an RF signal 313 with their FEM 18, and the signal is transmitted by the antenna 332, step 315.

For example, if the array is sending a first beam in direction A where the service cell is distance B, then A and B determine the size/shape of the aperture. In some embodiments, there can be one or more pre-calculated versions of that aperture and every time the array sends a beam to that direction/distance, the control satellite processor uses the same aperture using the same antennas. In other embodiments, the placement of the aperture on the array can be dynamically determined in real time by the control satellite processor (or other processor such as one or more of the small satellite processors), based on the current use of the array antennas.

Figures 19A, 19B, 19C:
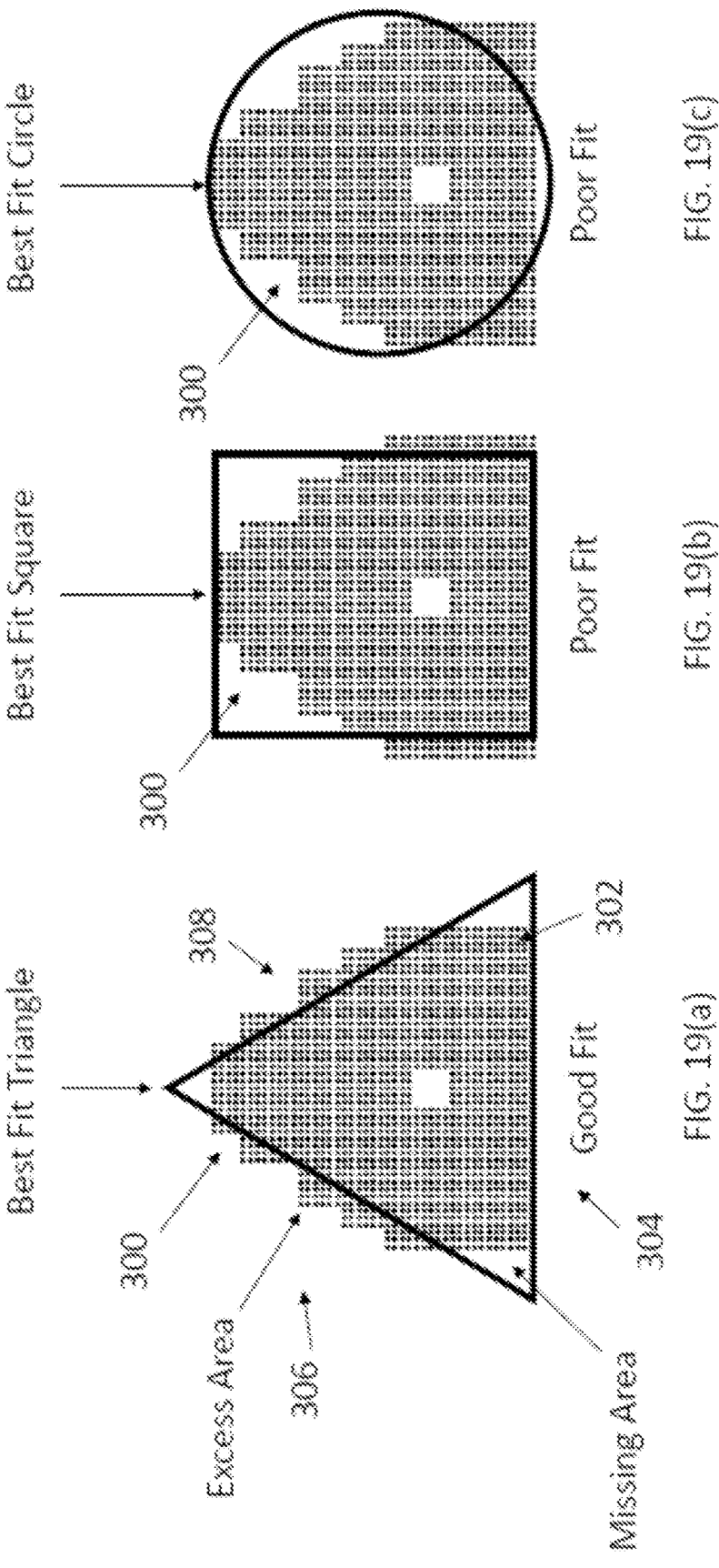
FIGS. 19(*a*)-19(*c*), 20(*a*)-20(*c*) show determination of a phased array shape based on a best fit triangle, square and circle.

It is noted that several embodiments (FIGS. 3(*c*), 8-11, 12(*b*), 12(*c*), 16, 18) illustrate a rounded triangular shape for the array 300. Referring to FIGS. 19-20, a phase array 300 is said to be triangular when it has more similarity to a triangle than it does to a regular polygon, and especially a circle or square. Similarity can be established using a best-fit equilateral triangle, where best-fit is determined by having equivalent excess area and missing area as seen in FIGS. 19(*a*)-19(*c*). The quality of the fit is determined by the excess area to the best-fit equilateral triangle which is therefore equivalent (though not necessarily drawn to scale in the figures) to the missing area to the best-fit equilateral triangle. In the case of FIGS. 19(*a*)-19(*c*), the best-fit triangle (FIG. 19(*a*)) yields a better match (less excess area) than the best-fit square (FIG. 19(*b*)) and best-fit circle (FIG. 19(*c*)), and thus the array 300 is considered to be triangular pursuant to this disclosure. However, in FIGS. 20(*a*)-20(*c*), the best-fit circle (FIG. 20(*c*)) yields a better match (less excess area) than the best-fit triangle (FIG. 20(*a*)) and best-fit square (FIG. 20(*b*)), and thus the array 300 is considered to be circular pursuant to this disclosure. Thus, a phase array that is non-triangular will show a greater resemblance to a best-fit circle, best-fit square, or other best-fit regular polygon. An example of this can be seen in FIG. Y5 where the array has a close match to the best-fit circle.

It is further noted that the triangular array 300 of FIG. 19(*a*) has three sides, namely a bottom 304, a left side 306, and a right side 308. As illustrated, the small satellites 302 of the array 300 are square and arranged in rows and columns. The array 300 has a linear bottom whereby that the small satellites 302 are linearly aligned at the bottom 304, and align with (or is parallel to) the bottom of the best fit triangle. The array 300 extends straight upward from the bottom 304 for a number of rows and then tapers inward at the left side 306 and right side 308, such that the columns at the left and right sides 306, 308 are the smallest and get progressively longer to the center of the array. Since the small satellites 302 are square (or rectangular), the left and right sides 306, 308 of the array are stepped and do not form smooth linear sides that exactly align with (or are parallel to) the left and right sides of the best fit triangle, leading to excess area between the best fit triangle and the left and right sides 306, 308 of the array 300, and missing areas at the corners of the best fit triangle. In addition, the tapered sides 306, 308 can start closer to the bottom 304 than the embodiment shown in FIG. 19(*a*) to have a triangle or triangular shape. It is further noted that the small satellites can be reconfigured to form more of a rounded triangle to better align with apertures that are ellipses that cannot fit into the pointed corners of a triangle shape.

And it is further pointed out that by having a triangular configuration, fewer small satellites 302 are required as compared with a square or circular configuration, which reduces weight of the array 300 yet at the same time does not result in a loss of communication since the small satellites 302 that are removed from the square or circular configuration would have otherwise been unused or minimally used.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

It is noted that the drawings may illustrate, and the description and claims may use geometric or relational terms, such as triangular, rounded, ellipse, circular, elongated, equilateral, top, bottom, right, left, square, beneath, compressed, etc. These terms are not intended to limit the disclosure and, in general, are used for convenience to facilitate the description based on the examples shown in the figures. In addition, the geometric or relational terms may not be exact due to mechanical fluctuations and variations.

Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all.

What is claimed is:

1. A satellite phased array comprising:
a plurality of satellite antennas configured to communicate with user equipment within fixed communication cells on earth, said plurality of antennas defining an outer perimeter boundary, the outer perimeter boundary having a triangular shape;
wherein the triangular shape has rounded corners.

2. The satellite phased array of claim 1, wherein each of said plurality of satellite antennas belongs to one or more satellite antenna groupings that are circular or elliptical.

3. The satellite phased array of claim 2, wherein one or more of said satellite antenna groupings is configured to generate a signal to communicate across a hexagonal cell on Earth.

4. The satellite phased array of claim 2, wherein each of the satellite antenna groupings have a size, shape and direction to communicate with a respective communication cell, the size, shape and direction based on a size and shape of the respective communication cell and a distance of the respective communication cell to said satellite phased array.

5. The satellite phased array of claim 4, wherein each satellite antenna grouping is configured to form a beam having a size, shape, and power to directly communicate with the respective communication cell.

6. The satellite phased array of claim 4, wherein:

a first grouping of said plurality of satellite antennas is configured to generate a first beam having a first size and first shape to directly communicate with a first communication cell, and a second grouping of said plurality of satellite antennas is configured to generate a second beam having a second size and a second shape to directly communicate with a second cell, wherein the first size differs from the second size, and the first shape differs from the second shape.

7. The satellite phased array of claim 1, wherein the satellite phased array is used in Low Earth Orbit.

8. The satellite phased array of claim 1, wherein the triangular shape benefits the distribution of radiated power across the plurality of satellite antennas when all beams have equal power.

9. A satellite phased array, comprising:

a plurality of satellite antennas configured to communicate with user equipment within fixed communication cells on earth, the plurality of antennas defining an outer perimeter boundary, the outer perimeter boundary having a triangular shape;

wherein the triangular shape benefits the distribution of radiated power across the plurality of satellite antennas when power is preferentially distributed to beams pointing to hexagonal cells on the Earth that are closer to the satellite.

10. A satellite phased array, comprising:

a plurality of satellite antennas configured to communicate with user equipment within fixed communication cells on earth, the plurality of antennas defining an outer perimeter boundary, the outer perimeter boundary having a triangular shape;

wherein the triangular shape benefits the distribution of radiated power across the plurality of satellite antennas when power is preferentially distributed to beams pointing to hexagonal cells on the Earth that are farther away from the satellite phased array.

11. A satellite phased array, comprising:

a plurality of satellite antennas configured to communicate with user equipment within fixed communication cells on earth, the plurality of antennas defining an outer perimeter boundary, the outer perimeter boundary having a triangular shape;

wherein the triangular shape is an equilateral triangle with congruent interior angles.

12. The satellite phased array of claim 11, wherein the interior angles are sixty degrees.

13. A satellite phased array comprising:

a plurality of satellite assemblies, each having an outer layer including an antenna element that is configured to communicate with user equipment on the ground;

wherein the plurality of satellite assemblies is arranged to form an outer perimeter boundary, the outer perimeter boundary having a triangular shape; and wherein the triangular shape benefits the distribution of radiated power across the plurality of satellite assemblies when power is preferentially distributed to beams pointing to hexagonal cells on the Earth that are closer to the satellite phased array.

14. The satellite phased array of claim 13, wherein each of said plurality of satellite assemblies belongs to one or more satellite antenna groupings that are circular or elliptical.

15. The satellite phased array of claim 14, wherein one or more of said antenna groupings are configured to generate a signal to communicate across a hexagonal cell on Earth.

16. A satellite phased array, comprising:

a plurality of satellite assemblies, each having an outer layer including an antenna element that is configured to communicate with user equipment on the ground;

wherein the plurality of satellite assemblies is arranged to form an outer perimeter boundary, the outer perimeter boundary having a triangular shape; and wherein the triangular shape has rounded corners.

17. The satellite phased array of claim 13, wherein the satellite phased array is in Low Earth Orbit.

18. The satellite phased array of claim 13, wherein the triangular shape benefits the distribution of radiated power across the plurality of satellite assemblies when all beams have equal power.

19. A satellite phased array, comprising:

a plurality of satellite assemblies, each having an outer layer including an antenna element that is configured to communicate with user equipment on the ground;

wherein the plurality of satellite assemblies is arranged to form an outer perimeter boundary, the outer perimeter boundary having a triangular shape; and wherein the triangular shape benefits the distribution of radiated power across the plurality of satellite assemblies when power is preferentially distributed to beams pointing to hexagonal cells on the Earth that are farther away from the satellite phased array.

20. An array of satellite antennas comprising:

a plurality of interconnected satellite antennas configured to directly communicate with user equipment within fixed communication cells on earth; and a processing device configured to define subsets of said plurality of satellite antennas, each subset of said plurality of satellite antennas configured to directly communicate with a respective communication cell, wherein each subset of said plurality of satellite antennas has beamforming characteristics based on at least one of a size of the respective communication cell, a shape of the respective communication cell, or a distance of the respective communication cell to said arrays;

wherein each subset of said plurality of satellite antennas forms a respective aperture.

21. The array of claim 20, wherein the beamforming characteristics comprise a size, shape and direction for each subset of said plurality of antennas.

22. The array of claim 20, wherein the beamforming characteristics comprise a phase, amplitude, frequency and power for each subset of said plurality of antennas.

23. The array of claim 20, wherein the subsets of said plurality of satellite antennas overlap with one another.

24. An array of satellite antennas, comprising:

a plurality of interconnected satellite antennas configured to directly communicate with user equipment within fixed communication cells on earth; and a processing device configured to define subsets of said plurality of satellite antennas, each subset of said plurality of satellite antennas configured to directly communicate with a respective communication cell, wherein each subset of said plurality of satellite antennas has beamforming characteristics based on at least one of a size of the respective communication cell, a shape of the respective communication cell, or a distance of the respective communication cell to said array;

wherein a first subset of said plurality of satellite antennas is circular and a second subset of said plurality of satellite antennas is elliptical.

25. A method for communication via a satellite antenna array to communicate with user equipment within fixed communication cells on earth, the method comprising:

providing a plurality of interconnected satellite antennas to form the satellite antenna array; and defining, using a processing device, subsets of the plurality of satellite antennas, each subset of the plurality of satellite antennas configured to directly communicate with a respective communication cell, wherein each subset of the plurality of satellite antennas has beamforming characteristics based on at least one of a size of the respective communication cell, a shape of the respective communication cell, or a distance of the respective communication cell to said arrays;

wherein the beamforming characteristics comprise a phase, amplitude, frequency and power for each subset of the plurality of antennas.

26. The method of claim 25, wherein the beamforming characteristics comprise a size, shape and direction for each subset of said plurality of antennas.

27. The method of claim 25, wherein the subsets of the plurality of satellite antennas overlap with one another.

28. A method for communication via a satellite antenna array to communicate with user equipment within fixed communication cells on earth, the method comprising:

providing a plurality of interconnected satellite antennas to form the satellite antenna array; and defining, using a processing device, subsets of the plurality of satellite antennas, each subset of the plurality of satellite antennas configured to directly communicate with a respective communication cell, wherein each subset of the plurality of satellite antennas has beamforming characteristics based on at least one of a size of the respective communication cell, a shape of the respective communication cell, or a distance of the respective communication cell to said array;

wherein a first subset of the plurality of satellite antennas is circular and a second subset of the plurality of satellite antennas is elliptical.

29. A method for communication via a satellite antenna array to communicate with user equipment within fixed communication cells on earth, the method comprising:

providing a plurality of interconnected satellite antennas to form the satellite antenna array; and defining, using a processing device, subsets of the plurality of satellite antennas, each subset of the plurality of satellite antennas configured to directly communicate with a respective communication cell, wherein each subset of the plurality of satellite antennas has beamforming characteristics based on at least one of a size of the respective communication cell, a shape of the respective communication cell, or a distance of the respective communication cell to said array;

wherein each subset of the plurality of satellite antennas forms a respective aperture.

* * * * *